United States Patent
McFarthing et al.

(10) Patent No.: US 10,454,741 B2
(45) Date of Patent: Oct. 22, 2019

(54) HIGH-PRECISION BLIND CARRIER SYNCHRONIZATION METHODS FOR LTE SC-FDMA UPLINK

(71) Applicant: PhasorLab, Inc., Billerica, MA (US)

(72) Inventors: Paul McFarthing, Boston, MA (US); Joshua C. Park, Billerica, MA (US); Jian Cui, Waltham, MA (US); Cuneyt Demirdag, Nashua, NH (US); Glen Wolverton, Holden, MA (US); Devang Topiwala, Nashua, NH (US)

(73) Assignee: PhasorLab, Inc., Billerica, MA (US)

( * ) Notice: Subject to any disclaimer, the term of this patent is extended or adjusted under 35 U.S.C. 154(b) by 80 days.

(21) Appl. No.: 15/295,349

(22) Filed: Oct. 17, 2016

(65) Prior Publication Data

US 2017/0111197 A1    Apr. 20, 2017

Related U.S. Application Data

(60) Provisional application No. 62/242,063, filed on Oct. 15, 2015.

(51) Int. Cl.
| | |
|---|---|
| *H04L 27/00* | (2006.01) |
| *H04L 27/26* | (2006.01) |
| *H04W 56/00* | (2009.01) |
| *H04J 11/00* | (2006.01) |

(52) U.S. Cl.
CPC .......... *H04L 27/265* (2013.01); *H04L 27/266* (2013.01); *H04L 27/2636* (2013.01); *H04L 27/2676* (2013.01); *H04W 56/002* (2013.01); *H04J 11/00* (2013.01); *H04L 27/2671* (2013.01); *H04L 27/2682* (2013.01)

(58) Field of Classification Search
CPC combination set(s) only.
See application file for complete search history.

(56) References Cited

U.S. PATENT DOCUMENTS

| | | |
|---|---|---|
| 5,463,627 A | 10/1995 | Matsuoka et al. |
| 9,048,980 B2 | 6/2015 | Park |
| 9,538,537 B1 | 1/2017 | Cui et al. |
| 2003/0185322 A1 | 10/2003 | Takahashi |

(Continued)

OTHER PUBLICATIONS

Maja Sliskovic, "Sampling Frequency Offset Estimation and Correction in OFDM Systems," ICES 2001, 8th IEEE International Conference on Electronics, Circuits and Systems Sep. 2001, Malta, Malta.

(Continued)

*Primary Examiner* — Lan-Huong Truong
(74) *Attorney, Agent, or Firm* — Michael Y. Saji

(57) ABSTRACT

Methods and systems are described for frequency domain correction, time domain correction, and combinations thereof. Each Long Term Evolution (LTE) uplink residual frequency offset can be determined with less than 1 part per billion accuracy simultaneously and used for frequency offset correction. The disclosed method utilizes the same modulated signals for data and control as the 3GPP LTE wireless standard and can be embedded directly into the base station (downlink) PHY without additional hardware. The use of the disclosed methods provide multiple ways to simultaneously improve the uplink data throughput for every user in an LTE multiple access wireless system.

31 Claims, 20 Drawing Sheets

(56) References Cited

U.S. PATENT DOCUMENTS

| | | | |
|---|---|---|---|
| 2004/0120409 A1* | 6/2004 | Yasotharan | H03H 17/0294 |
| | | | 375/260 |
| 2005/0197064 A1 | 9/2005 | Ibrahim et al. | |
| 2008/0273641 A1 | 11/2008 | Yang et al. | |
| 2013/0039392 A1* | 2/2013 | Chu | G01S 19/246 |
| | | | 375/150 |
| 2014/0177585 A1* | 6/2014 | Jang | H04L 5/0091 |
| | | | 370/329 |
| 2016/0211999 A1 | 7/2016 | Wild et al. | |

OTHER PUBLICATIONS

Zhen Gao, Mary Ann Ingram, "Self-Cancellation of Sample Frequency Offset in OFDM Systems in the Presence of Carrier Frequency Offset," 2010 IEEE 72nd VTC Sep. 2010 Ottawa, Canada.
Yonathan Murin, Ron Dabora, "Efficient Estimation of Carrier and Sampling Frequency Offsets in OFDM Systems," IEEE WCNC' Apr. 14, 2014, Istanbul, pp. 440-445.

\* cited by examiner

HIGH-PRECISION BLIND CARRIER SYNCHRONIZATION METHODS FOR LTE SC-FDMA UPLINK

CROSS-REFERENCE TO RELATED APPLICATIONS

This application claims the benefit of priority under 35 U.S.C. 119(e) of U.S. Provisional Patent Application No. 62/242,063, filed Oct. 15, 2015 and titled "High-Precision Blind Carrier Synchronization Methods for LTE SC-FDMA Uplink," which is hereby incorporated by reference in its entirety for all purposes.

BACKGROUND

Carrier synchronization provides a means to improve the data throughput between the nodes of a communication link by removing the frequency offset that can impose limitations on the order of a modulation that is used. Typically, the higher the order of the modulation used, the more susceptible it is to perturbations that may be random or systematic in nature; the former typically arise from noise sources combining to generate a flat frequency, Gaussian amplitude in the first case and frequency offset in the second.

High-Precision Carrier Synchronization Technology (HPCST) in its original form is a time-domain approach whereby the average correlation between the in-phase and quadrature components of a signal is used to find where the applied frequency and phase offsets precisely cancel out the offset present in the signal, as described in U.S. Pat. No. 9,048,980, hereby incorporated by reference in its entirety. These offsets are a consequence of the transmitter and receiver systems not being synchronized. Further theoretical background appears below.

While existing methods address blind synchronization in general, a need exists to specifically provide greater synchronization of mobile stations with base stations in cellular networks, such as in Long Term Evolution (LTE), which can thereby enable higher data throughput at higher speeds or increased service availability in the cell range.

SUMMARY

In one embodiment, a method for blind carrier synchronization may be disclosed, comprising: applying an N-point discrete Fourier transform (DFT) to a received time domain signal to produce a frequency domain signal; using a channel schedule to select portions of the frequency domain signal that correspond to signals received from a single user equipment (UE); applying a first frequency offset and a first phase offset to the selected portions of the frequency domain signal to produce a frequency and phase offset corrected frequency domain signal; applying an M-point inverse discrete Fourier transform (IDFT) to a frequency and phase offset corrected frequency domain signal based on the selected portions of the frequency domain signal to produce an intermediate time domain signal; computing a correlation function of I and Q samples of the portions of the intermediate time domain signal over a range of frequency offset values and a range of phase offset values to iteratively search for a global maximum of the correlation function; identifying the global maximum of the correlation function over the range of frequency offset values and the range of phase offset values; and applying a final frequency offset and a final phase offset to the portions of the received time domain signal based on the identified global maximum.

The method may be performed in a frequency division duplexed system. The N-point DFT uses one of 128, 256, 512, 1024, 1536 or 2048 for N, and wherein the M-point IDFT uses 12 for M. The selected portions of the frequency domain signal may be resource blocks received from the single user equipment (UE). The correlation function may comprise computing a cross-correlation of received I and Q samples. The correlation function may comprise computing a product of absolute values of received I and Q samples. The correlation function may comprise $J(\varepsilon',\varphi')=\Sigma_k\Sigma_l\{AB\}$, wherein $A=|real\{U(l,k,\varepsilon',\varphi')\}|$ and $B=|imag\{U(l,k,\varepsilon',\varphi')\}|$, and $$U(l,\varepsilon',\varphi') = e^{-j\left\{2\pi t_l \varepsilon'\left(1-\frac{k_l}{N}\right)-\varphi'\right\}} r_l,$$

where $k \in \left[-\frac{N}{2}, \frac{N}{2}-1\right] \cap \mathbb{Z}$ and $l = 1, 2, \ldots, N_{RB} \times N_{SPS}$.

The range of frequency offset values may be from a carrier frequency multiplied by a factor of −0.00000005 to the carrier frequency multiplied by a factor of +0.00000005, thereby constituting 100 parts per billion expected error, and the range of phase offset may be from 0 to π/2 radians. The method may be performed using I and Q samples obtained over either a 10 ms period or over a single full Long Term Evolution LTE frame. The method may further comprise performing a coarse search of the correlation function and a subsequent fine granularity search of the correlation function, the subsequent fine granularity search further comprising a binary search. The method may further comprise performing a search of the correlation function by evaluating the correlation function at phase offset values of 0, 22.5, 45, and 67.5 degrees.

In another embodiment, a method for blind carrier synchronization in a frequency division duplexed system using time domain data, comprising: applying at least one band pass filter to perform selection of portions of a received time domain signal that correspond to signals received from a single user equipment (UE) using a channel schedule; iteratively computing a correlation function of I and Q samples of the portions of the received time domain signal over a range of frequency offset values and a range of phase offset values; identifying a global maximum of the correlation function over the range of frequency offset values and the range of phase offset values; and applying a final frequency offset and a final phase offset to the portions of the received time domain signal based on the identified global maximum.

The method may further comprise receiving the received time domain signal from the single user equipment (UE) on a Long Term Evolution (LTE) uplink channel. The method may further comprise removing a cyclic prefix prior to applying the at least one band pass filter. The portions of the received time domain signal may be resource blocks received from the single user equipment (UE). The method may further comprise applying a first frequency offset and a first phase offset based on whether normal or extended cyclic prefixes appear in the received time domain signal. The correlation function may comprise computing a cross-correlation of received I and Q samples. The correlation function may comprise computing a product of absolute values of received I and Q samples. The correlation function may comprise $S(\varepsilon,\varphi)=\Sigma_t|real\{R(t)e^{-i(2\pi\varepsilon t+\varphi)}\}||imag\{R(t)e^{-i(2\pi\varepsilon t+\varphi)}\}|$, where $R(t)$ is a received time domain signal. The range of frequency offset values may be from a carrier frequency multiplied by a factor of −0.00000005 to the carrier frequency multiplied by a factor of +0.00000005, thereby constituting 100 parts per billion expected error, and the range of phase offset may be from 0 to π/2 radians.

In another embodiment, a method for blind carrier synchronization in a frequency division duplexed system using frequency domain data, comprising: applying an N-point discrete Fourier transform (DFT) to a received time domain signal to produce a frequency domain signal; selecting portions of the frequency domain signal that correspond to signals received from a single user equipment (UE) using a channel schedule; and iteratively computing a correlation function of I and Q samples of the selected portions of the frequency domain signal over a range of frequency offset values and a range of phase offset values.

The method may further comprise identifying a global stationary point of the correlation function over the range of frequency offset values and the range of phase offset values; and applying a final frequency offset and a final phase offset to the portions of the frequency domain signal based on the identified global stationary point. The correlation function may be computed over a set of input I and Q samples collected over a particular time period. The method may further comprise receiving the received time domain signal from the single user equipment (UE) on a Long Term Evolution (LTE) uplink channel. The N-point DFT uses one of 128, 256, 512, 1024, 1536 or 2048 for N. The selected portions of the frequency domain signal may be resource blocks received from the single user equipment (UE). The correlation function may comprise computing a cross-correlation of received I and Q samples. The correlation function may comprise computing a product of absolute values of received I and Q samples. The correlation function may comprise $J(\varepsilon',\varphi')=\Sigma_k\Sigma_l\{AB\}$, wherein $A=|real\{U(l,k,\varepsilon',\varphi')\}|$ and $B=|imag\{U(l,k,\varepsilon',\varphi')\}|$ and $$U(l, k, \varepsilon', \varphi') = e^{-j\{2\pi t_l \varepsilon'(1-\frac{k}{N})-\varphi'\}} R_{l,k};$$

$$k \in \left[-\frac{N}{2}, \frac{N}{2}-1\right] \cap \mathbb{Z}; l = 1, 2, \ldots, N_{RB} \times N_{SPS}.$$

The range of frequency offset values may be from a carrier frequency multiplied by a factor of −0.00000005 to the carrier frequency multiplied by a factor of +0.00000005, thereby constituting 100 parts per billion expected error, and the range of phase offset may be from 0 to π/2 radians.

In another embodiment, a method for blind carrier synchronization in a frequency division duplexed system is disclosed, comprising: computing a three-dimensional surface based on a received frequency division duplexed radio signal, according to the equation $S(\varepsilon,\varphi)=\Sigma_t|real\{R(t)e^{-i(2\pi\varepsilon t+\varphi)}\}||imag\{R(t)e^{-i(2\pi\varepsilon t+\varphi)}\}|$, where R is the received signal; locating a stationary point of the surface; and finding a phase offset and a frequency offset based on the stationary point.

Various steps as described in the figures and specification may be added or removed from the processes described herein, and the steps described may be performed in an alternative order, consistent with the spirit of the invention. Features of one embodiment may be used in another embodiment. Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

DETAILED DESCRIPTION

Frequency-Domain OFDM HPCST

PhasorLab's patent-pending orthogonal frequency division multiplexing (OFDM) carrier synchronization technology is well suited for the LTE downlink, as described in U.S. Provisional Patent App. No. 62/203,750, hereby incorporated by reference herein in its entirety. Here the correlation between the in-phase and quadrature components of the frequency domain representation of a signal is used to identify the frequency and phase offset between the transmitter and receiver systems. Identifying these offsets to a high level of precision opens up the possibly to transmit higher order modulations in a given channel than would otherwise be possible. Refer to Appendix B for the theoretical background of our Blind Carrier Synchronization Method for OFDM Wireless Communication Systems.

SC-FDMA in LTE Uplink

The 3GPP LTE wireless standard uses single-carrier frequency division multiple access (SC-FDMA) modulation in an uplink (UL) channel from a mobile station (MS) to a base station (BS) to limit the power amplifier (PA) back-off in user equipment whereas OFDMA is used for multiple access in the downlink channel.

A link can either be scheduled to be time division duplex (TDD) or frequency division duplex (FDD); in the former, BS and MS take turns to transmit and receive, according to a known sequence, to avoid simultaneous transmission; in the latter, FDD, MS and BS transmit on widely separated frequencies to allow simultaneous transmission and reception and so potentially increase the data throughput.

Figure 1:
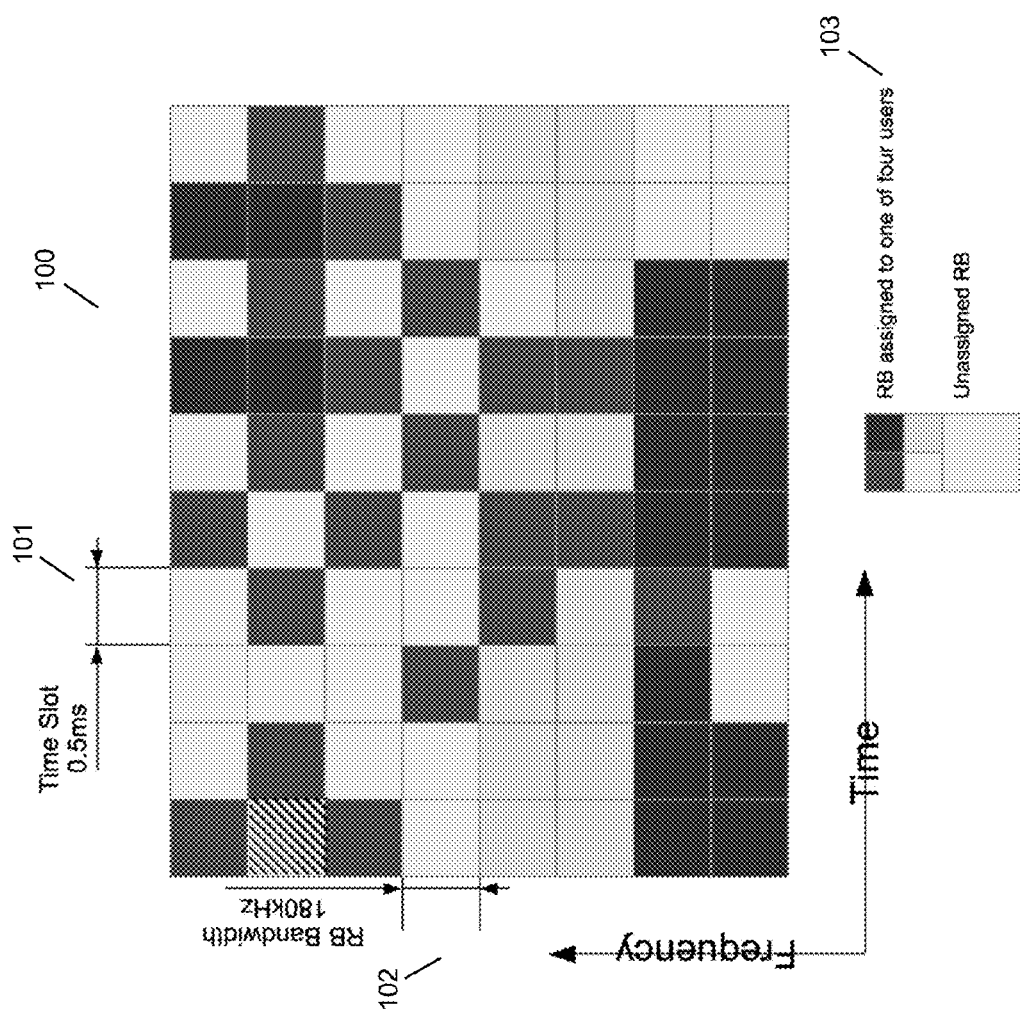
FIG. 1 is a schematic uplink resource grid diagram showing an example of assignation of resource blocks to different users, in accordance with some embodiments.

A BS schedules the uplink frequency and time slots in multiples of resource blocks (RBs) which are groups of 12 subcarriers separated by 15 kHz, giving a total bandwidth of multiples of 180 kHz, for one LTE time-slot of 0.5 ms. The position of the RBs assigned to a particular user can change on each 0.5 ms boundary. FIG. 1 is a schematic uplink resource grid diagram showing an example of assignation of resource blocks to different users, in accordance with some embodiments. Specifically, FIG. 1 shows a possible resource schedule or grid for four mobile stations over a period of 5 ms.

In FIG. 1, an uplink resource grid 100 is shown showing how four different users may be assigned different resource blocks (RBs) during a frame consisting of 5 sub-frames, each of which is made from two 0.5 ms time slots, giving a total of 5 ms. This grid may be understood to show a schedule of all UEs during the frame. The width of each time slot 101 is 0.5 ms, and the bandwidth of each resource block 102 is 180 kHz. 103 shows a legend for the visual representation shown in FIG. 1.

Each 0.5 ms time slot 101 is composed of multiple symbols that are preceded by copies of the final portion of their time domain representation, termed the cyclic prefix (CP). LTE provides for two different CP length styles, normal and extended. With normal, there are seven OFDM symbols per 0.5 ms, and with extended, there are six as shown in FIG. 2.

Figure 2:
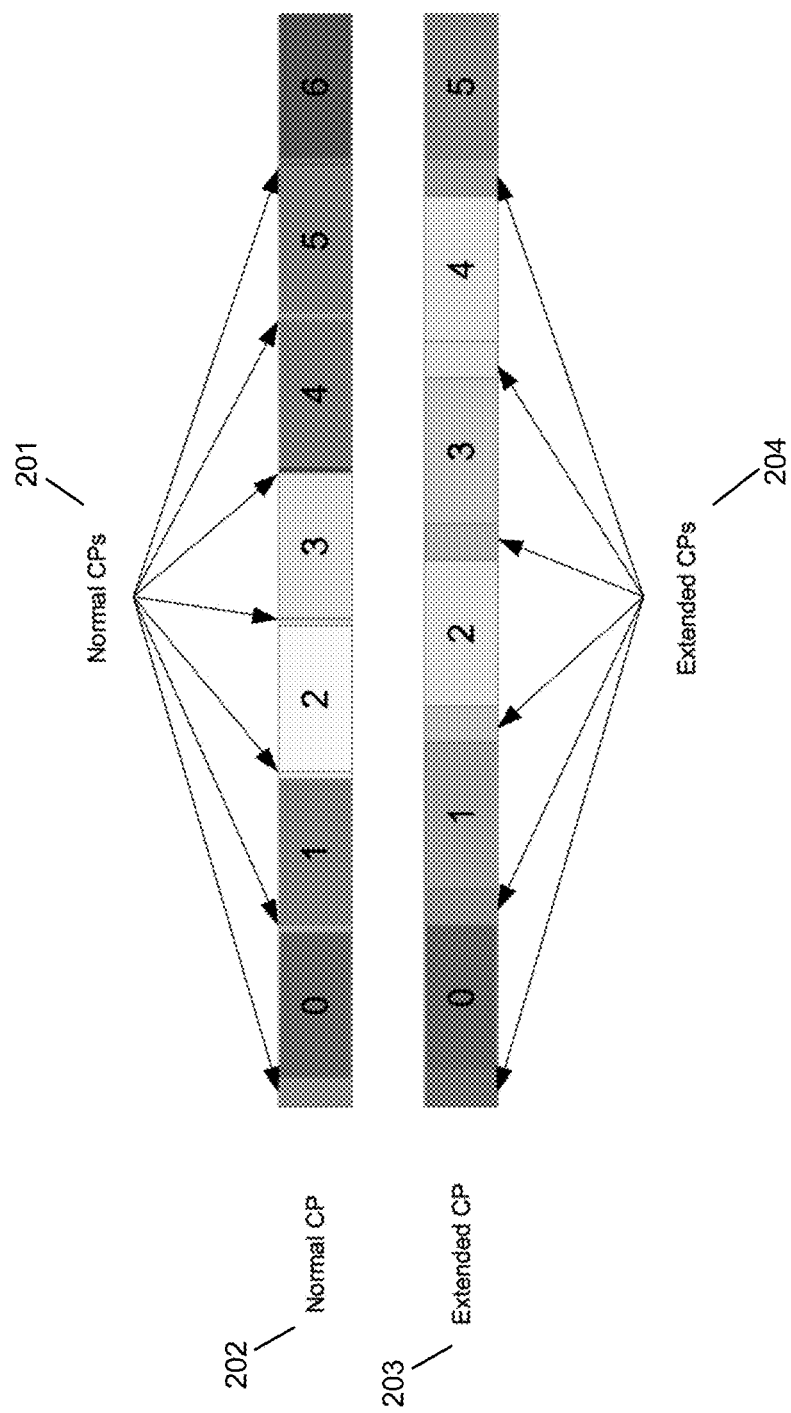
FIG. 2 is a schematic diagram of an LTE uplink time slot in normal and extended cyclic prefix mode, in accordance with some embodiments.

FIG. 2 is a diagram showing the composition of an LTE uplink time slot in normal and extended cyclic prefix (CP) mode, in accordance with some embodiments. As shown, either 7 or 6 data symbols are transmitted per 0.5 ms. Normal CP uplink time slot 202 is an LTE frame shown as symbols ordered by time from left to right, with intervening normal CP intervals 201 between symbols. Extended CP uplink time slot 203 is an LTE frame shown as symbols with intervening extended CP intervals 204 between symbols.

Depending on the format of the uplink channel being used, the LTE standard provides for training sequences, such as the demodulation reference signal (DRS), to be inserted at various symbol positions within a time slot to allow the BS to estimate characteristics of the transmission channel and apply corresponding corrections to the received data.

SC-FDMA, when compared with OFDM, involves an additional time-frequency transform that effectively spreads one data point across a number of sub-carriers, rather than a single data point modulating a single sub-carrier as in OFDM. This spreading is what gives SC-FDMA its desirable reduction in peak-to-mean ratio when compared with OFDM and gives rise to the notion of the data modulating a single carrier, at the center of the sub-carrier frequency range, rather than multiple sub-carriers. A consequence of this difference with OFDM is that the encoded data bits can be considered to originate in the time domain rather than frequency domain as shown in the example SC-FDMA transmit (Tx) and receive (Rx) chains in FIGS. 3A and 3B.

Figure 3A:
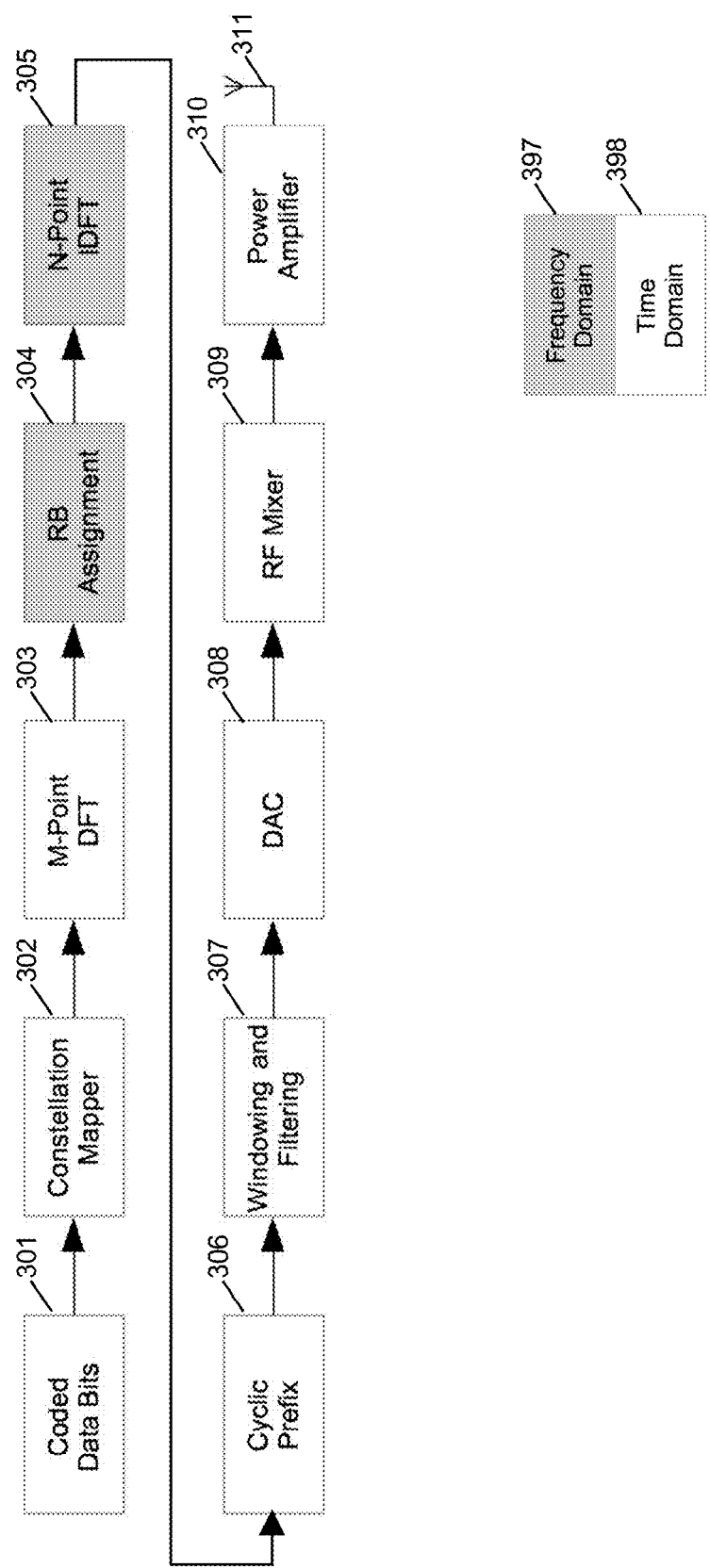
FIG. 3A is an SC-FDMA transmit chain diagram showing certain portions operating in the time domain and other portions operating in the frequency domain, in accordance with some embodiments.
Figure 3B:
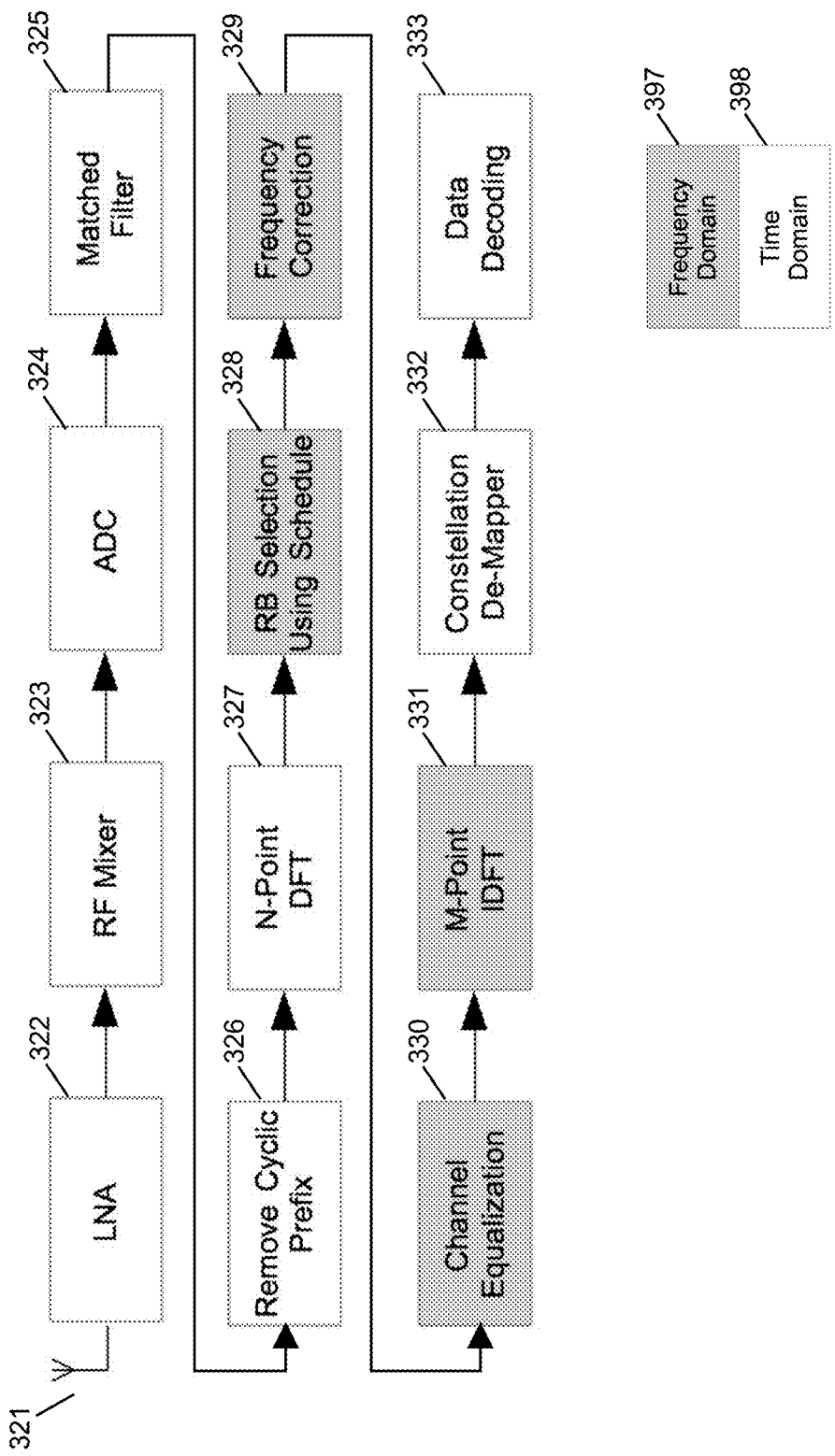
FIG. 3B is an SC-FDMA receive chain diagram showing certain portions operating in the time domain and other portions operating in the frequency domain, in accordance with some embodiments.

FIGS. 3A and 3B are example SC-FDMA transmit (FIG. 3A) and receive (FIG. 3B) chains highlighting whether components operate on time or frequency domain data. In LTE, M is the number of sub-carriers per RB which is 12 and N, depending on the Tx channel bandwidth, is either 128, 256, 512, 1024, 1536 or 2048.

FIG. 3A is an SC-FDMA transmit chain diagram showing certain portions operating in the time domain and other portions operating in the frequency domain, in accordance with some embodiments. Coded data bits arrive at block 301, entering constellation mapper 302, which feeds M-point DFT 303 to transform the time domain signal into a frequency domain signal. At block 304, resource block assignment occurs in the frequency domain using the frame schedule. At block 305, an N-point IDFT is performed to transform the signal back to a time domain signal. At block 306, cyclic prefixes are added, and at block 307, windowing and filtering is performed before entering into the digital to analog converter (DAC) 308. RF mixer 309 mixes the signal and power amplifier 310 amplifies the signal before transmission at antenna 311. Legends 397, 398 identify which portions operate in the frequency domain and which portions operate in the time domain, respectively.

FIG. 3B is an SC-FDMA receive chain diagram showing certain portions operating in the time domain and other portions operating in the frequency domain, in accordance with some embodiments.

The new invention described here takes advantage of our High-Precision Carrier Synchronization Technique that utilizes the modulated carrier signal power in a blind fashion to determine the frequency and phase offset present in an SC-FDMA signal thereby eliminating the need for beacons or other markers which reduce data throughput. Our new method utilizes the statistical nature of a quadrature signal to accurately measure the frequency shift in a received carrier signal, which results from a combination of the relative motion between the transmitter and receiver (Doppler shift) and frequency differences between their respective reference clocks.

Figure 4:
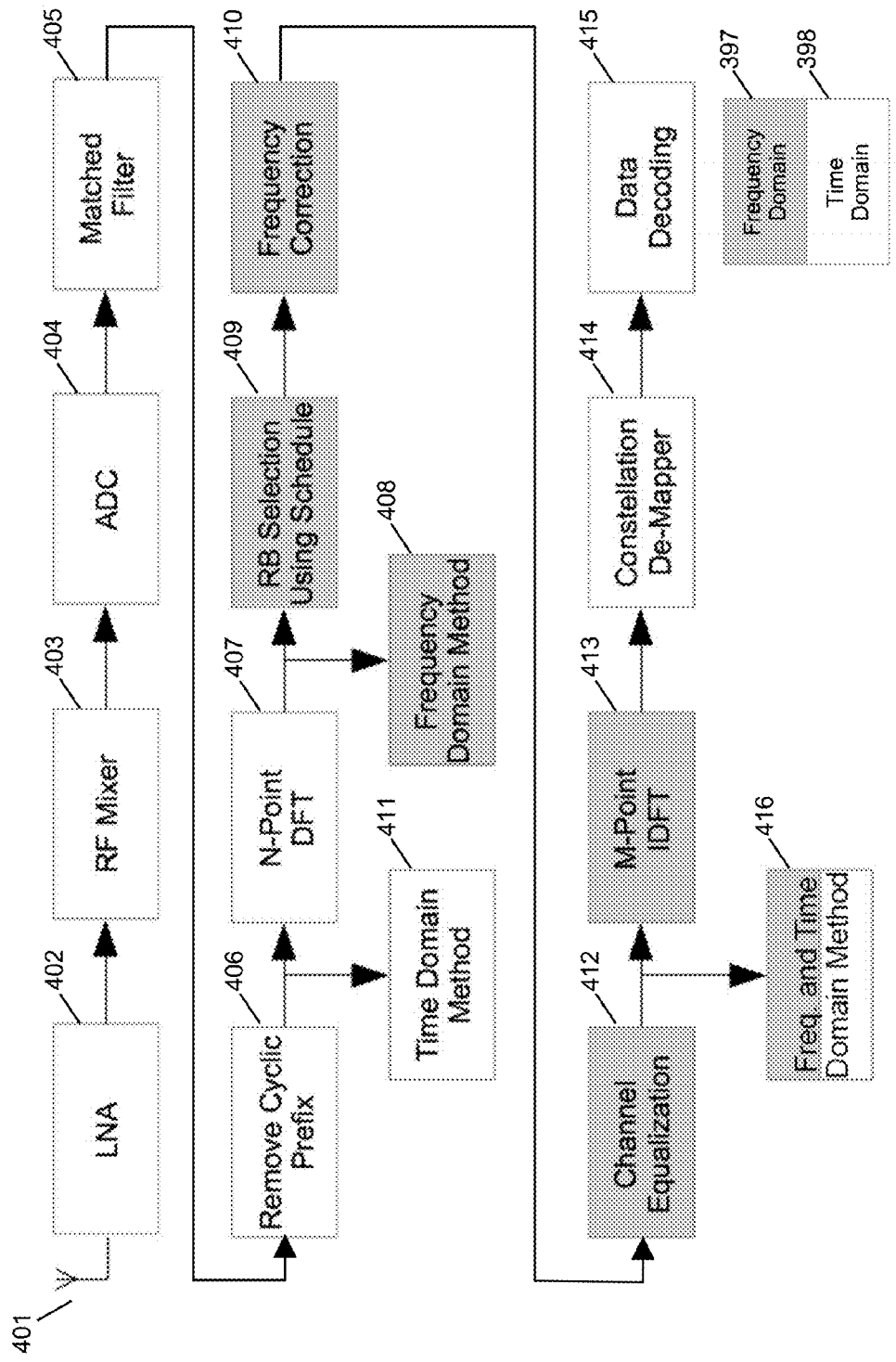
FIG. 4 is an SC-FDMA receive chain diagram showing frequency and phase offset processing, in accordance with some embodiments.

FIG. 4 shows various components in the physical layer of an SC-FDMA receive chain, in accordance with certain embodiments. The methods described herein for frequency and phase offset correction can operate on data extracted from various points of the SC-FDMA Rx chain as shown in FIG. 4. These various methods use either time domain data (processed at step 411), frequency domain data (processed at step 408), or a mixture of the two (processed at step 416), and are described below. While it is not contemplated for all three methods to be used in the same embodiment, combination of features across embodiments is understood to be contemplated.

FIG. 4. Location of where data may be extracted from the SC-FDMA Rx chain for processing by the disclosed frequency and phase offset estimation methods.

401 is an antenna.

402, LNA: The Low-noise amplifier (LNA) is usually the first component in a high performance radio receiver following the antenna, and increases the signal voltage without adding a significant amount of noise.

403, RF Mixer: The Radio Frequency (RF) mixer multiplies the incoming analog signal by a tone at the carrier frequency and a copy of the incoming analog signal by a tone lagging the first by $\pi/2$ to generate the in-phase (I) and quadrature (Q) components of the signal respectively.

404, ADC: The analog to digital converter (ADC) as shown here, first applies a low-pass filter to the I and Q analog components to reduce the effects of aliasing and then periodically samples the analog signal, quantizes the voltage level and outputs a digital representation of the analog signal.

405, Matched Filter: A matched filter such as the square root raised cosine filter may be employed in the SC-FDMA transmit and receive chains which together serve to minimize the effect of inter-symbol interference (ISI).

406, Remove Cyclic Prefix: The CP that was added in the transmitter to each symbol is discarded at this point.

411, Time domain method: If cancellation of offset is desired to be performed in the time domain, the partially-processed samples from the remove cyclic prefix 406 step may be used by the time domain method at this stage.

407, N-Point DFT: With the CP removed, the remaining N samples of the complex time domain symbol are passed through a discrete Fourier transform (DFT) to generate a frequency domain representation of this symbol. A Fast Fourier Transform (FFT) algorithm is often used to implement this process.

408, Frequency domain method: If cancellation of offset is desired to be performed in the frequency domain, the partially-processed samples from the N-Point DFT 407 may be used by the frequency domain method at this stage.

409, RB Selection Using Schedule: With the frequency domain representation of a signal and a knowledge of the channel schedule, an LTE BS is able at this point to separate the data that has been received from different users allowing for parallel processing. The remainder of the receive chain considers data from a single user.

410, Frequency Correction: Phase offsets may be applied at this point to correct for the detected frequency differences between the received signal and the local reference oscillator for a given user.

412, Channel Equalization: To compensate for the effects of a non-AWGN transmission channel, the receiver can apply corrections to the received signal in the frequency domain, based on the effect that the channel has had on known reference signals sent by the transmitter.

416, Frequency and Time Domain Method: In some cases a mixed frequency and time domain method may be used and data may be obtained from the signal path at this stage.

413, M-Point IDFT: The channel-corrected frequency domain data is converted back to the time domain using an inverse discrete Fourier transform, often implemented using an Inverse Fast Fourier Transform (IFFT) algorithm.

414, Constellation De-Mapper: Uses the magnitude and sign of a pair of I and Q time domain values to generate a modulation dependent numerical output.

415, Data Decoding: The numbers generated by the de-mapper are decoded using a known system, such as Turbo code decoding, in an attempt to detect and correct for errors introduced into the data by the transmission and reception process. Decoded data is then checked for consistency and passed to a higher layer in the receiver architecture.

Time Domain Method (Labeled 411 in FIG. 4)

In Method 1, the frequency offset is measured using the time domain data extracted from the Rx chain prior to the N-Point DFT and following removal of the CP. Filters are used to extract the contribution to the received signal from a single user. A number of variations exist for how this filtering may be implemented, of which two are shown below. In the first, a series of band-pass filters are used in conjunction with the uplink schedule to return the signal contribution from a single MS, colored red, as shown using the example resource grid in FIG. 5.

Figure 5:
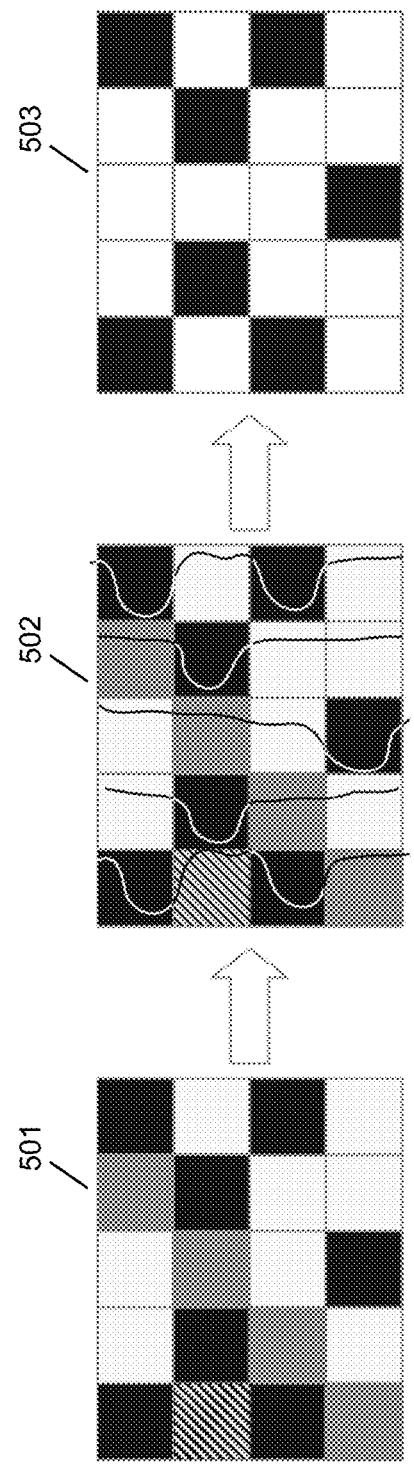
FIG. 5 is a schematic diagram showing extraction of a single UE's signal from a time domain SC-FDMA signal, in accordance with some embodiments.

FIG. 5 is a schematic diagram showing extraction of a single UE's signal from a time domain SC-FDMA signal, in accordance with some embodiments. The contribution to the received time domain SC-FDMA signal from a single user (Black) is extracted from a received signal by applying a series of band-pass filters. 501 shows an LTE frame gridded by time (x axis) and frequency (y axis). 502 shows frequency histograms of signals found within each timeslot from a particular user. The peak of transmissions from the single user appear in the black timeslots and frequency bands. 503 shows the isolation and identification of the black grid squares.

Figure 6:
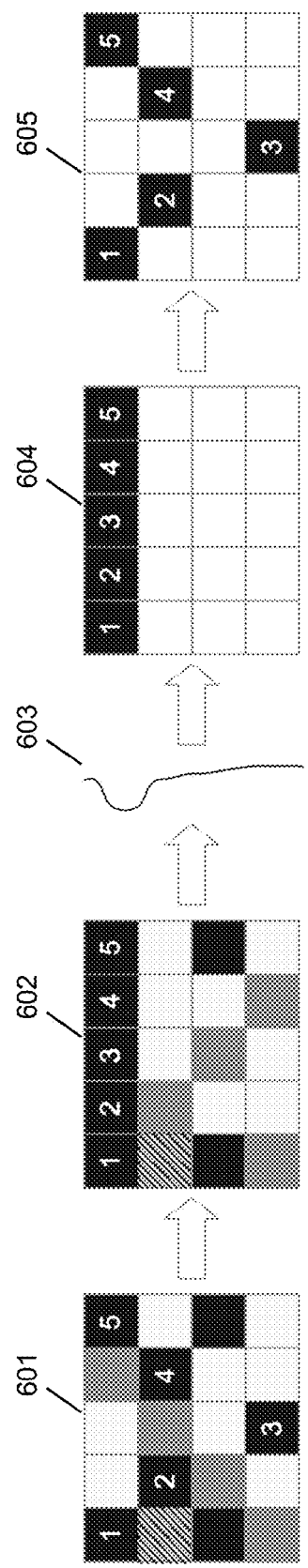
FIG. 6 is a schematic diagram showing extraction of a single UE's signal using an alternate time domain filtering technique, in accordance with some embodiments.

In the second, a similar result could be achieved by mixing each slot with a different shift frequency and then applying a single band-pass filter followed by the reverse shift, as in FIG. 6.

FIG. 6 is a schematic diagram showing extraction of a single UE's signal using an alternate time domain filtering technique, in accordance with some embodiments. 601 shows an LTE frame gridded by time (x axis) and frequency (y axis). 602 shows that, when a different shift frequency is mixed into the signals in each column, the frequencies of signals from the single UE (black) can be caused to line up in a particular time slot. 603 shows that a single frequency band pass filter may be used, instead of multiple such filters, once the signals have been lined up as in step 602. 604 shows isolation of the black grid squares. 605 shows identification of the black grid squares in the original LTE grid.

Notably, the second method only has one RB per time slot in the result, but it was found that the number of time slots was of greater significance on improving the quality of the offset estimation than the number of parallel RBs from a single user.

Figure 14:
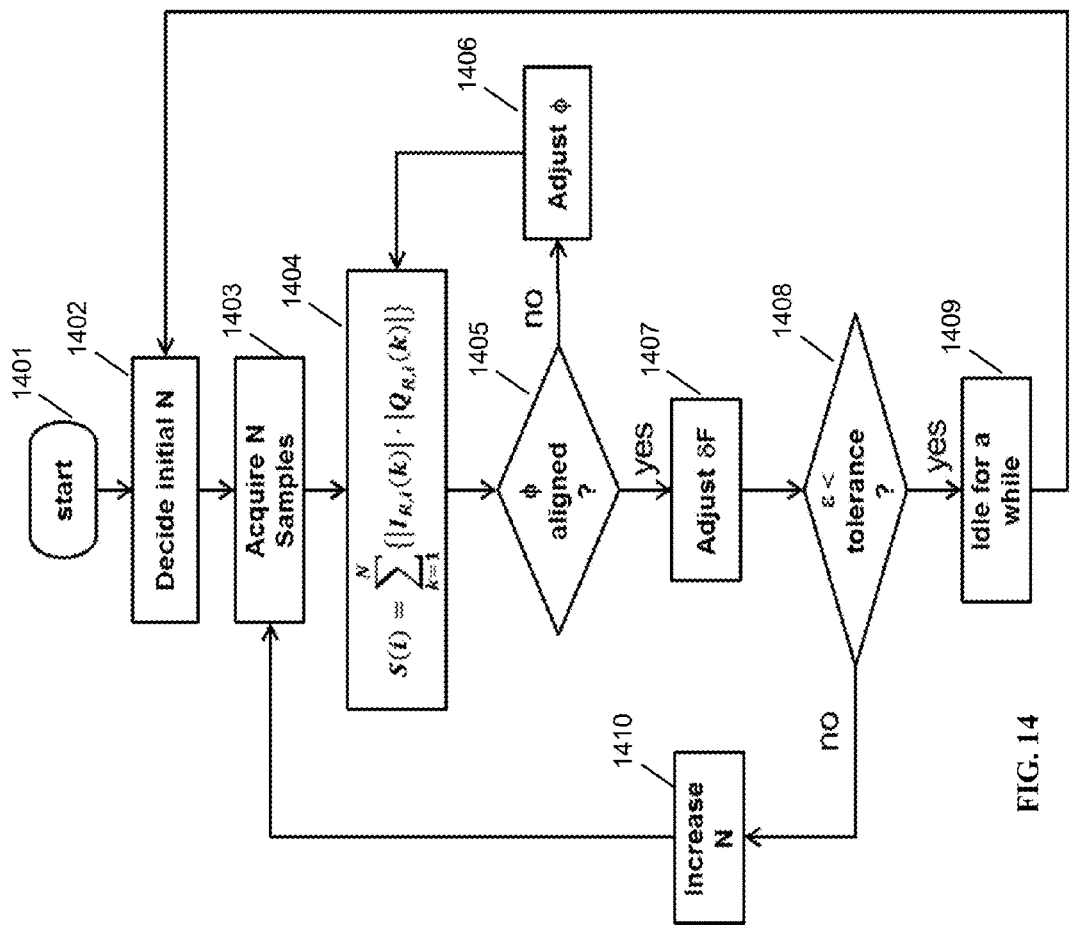
FIG. 14 is a flowchart showing carrier synchronization and phase alignment, in accordance with some embodiments.

With the signal contributions from each user, these separate signals can now be processed to extract the frequency and phase offset information using the method described in Appendix A and [1], and depicted in the flow chart shown in FIG. 14. So the time domain method can be summarized by the following procedure:

1. With a knowledge of the channel schedule collate the portions of the time domain signal using band-pass filtering that originate from a given user.

2. Apply known frequency and phase offsets to this time domain signal, which requires a knowledge of whether normal or extended CPs have been used (FIG. 2) to correctly infer the sample times.

3. Find the relationship between the in-phase (I) and quadrature (Q) components of this frequency and phase offset time domain signal using a correlation function such as the one shown in Equation (16), where the product of the absolute values of I and Q for a series of received data samples are summed. As discussed in Appendix A, alternative functions to the absolute function, such as taking the square, of I and Q could also be used.

4. Iterate steps 2 through 3, sweeping through the frequency offset range and phase range of 0 through $\pi/2$ until the global maximum of the correlation function is found to the required level of precision. This global maximum occurs at the frequency and phase offset of the received signal.

Note that although the data is shown as being extracted from the Rx chain following CP removal in FIG. 4, the CP could be discarded once the signal contributions are separated using the band-pass filtering described above. Discarding the CP reduces the impact of inter-symbol interference due to multi-path components in the transmission channel, and so improves the quality of the result.

Frequency Domain Method (Labeled 308 in FIG. 4)

Figure 7:
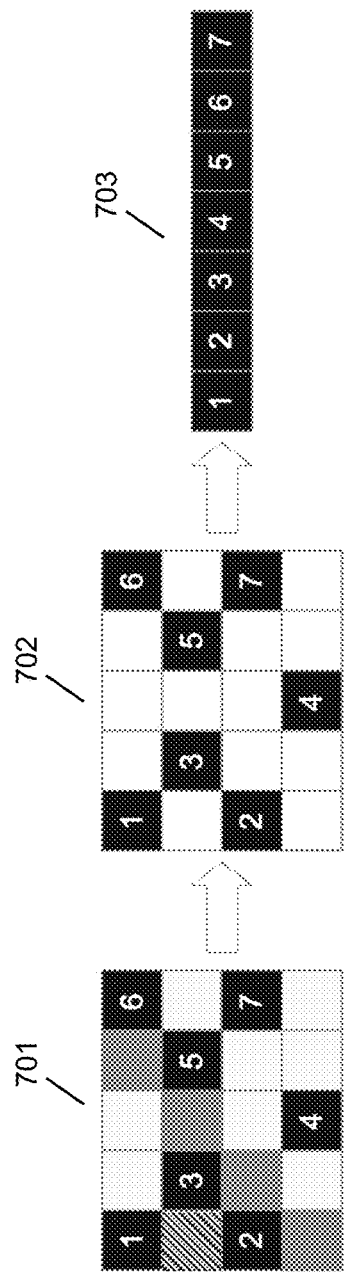
FIG. 7 is a schematic diagram showing extraction of a single UE's signal from a frequency domain signal, in accordance with some embodiments.

Data is extracted from the Rx chain following the N-point DFT, as shown in FIG. 4, then using the channel schedule, the RBs for a particular user are selected (FIG. 7). Data could also be tapped out following frequency domain equalization to improve performance in a non-AWGN transmission channel.

FIG. 7 is a schematic diagram showing extraction of a single UE's signal from a frequency domain signal, in accordance with some embodiments. Selection of the RBs pertaining to a single user (Black) from the N-point frequency domain data is performed. At 701, an input LTE frame is shown. At 702, the signals are transformed into the frequency domain and identified as belonging to a particular UE. At 703, the signals can be reordered into their proper order.

The channel schedule gives the sub-carrier indices in the N-point frequency domain for the selected RBs which are numbered 1 through 7 in the example shown in FIG. 7); each RB has M sub-carriers (12 in the LTE uplink schedule) which will be 12 successive values in the range of $-N/2$ through $+(N/2)-1$. The total number of OFDM symbols available is given by the product of the number of RBs (N_RB) in the received signal and the number of symbols per time slot (N_SPS) which is 7 or 6 depending on whether normal or extended CPs are used, respectively. This information can be substituted into the method described in Appendix B, to generate this slight variant of the quantity U, presented in Equation (27), as shown below in Equation (1) where $t_l$ is the time corresponding to each OFDM symbol; $\epsilon'$ is the estimated frequency offset and $\varphi'$ the estimated phase offset.

$$U(l,k,\epsilon',\varphi') = e^{-j\left\{2\pi t_l \epsilon'\left(1-\frac{k}{N}\right)-\varphi'\right\}} R_{l,k};$$

$$k \in \left[-\frac{N}{2}, \frac{N}{2}-1\right] \cap \mathbb{Z} \, ; l = 1, 2, \ldots, N_{RB} \times N_{SPS}$$

(1)

From U, an objective function can be derived in a similar manner to that outlined in Equations (29), (31) and (36) as shown below (Equations (2) through (3)).

$$A=|\text{real}\{U(l,k,\epsilon',\varphi')\}| \text{ and } B=|\text{imag}\{U(l,k,\epsilon',\varphi')\}|$$ (2)

$$J(\epsilon',\varphi')=\Sigma_k \Sigma_l \{AB\}\}$$ (3)

As noted below in Appendix A, the functions A and B can differ, and instead of the absolute function, the square could be taken (as in Equation (31)), or square root, or a combination of powers, so that there exist many A and B which will give an objective function J from which the frequency and phase offset can be found by searching for the global maximum (or minimum). The phrase "stationary point" is used herein to mean either or both a maximum or a minimum, as appropriate from context. As well, the term "global" is used herein to mean global only with respect to the equation or system that can be known based on the I and Q samples obtained from the synchronization process, which may be obtained during a limited time window.

$$A=f(\text{real}\{U(l,k,\epsilon',\varphi')\}) \text{ and } B=g(\text{imag}\{U(l,k,\epsilon',\varphi')\})$$ (4)

Therefore, the frequency domain procedure can be summarized as follows:

1. Using the channel schedule select RBs corresponding to a single user from the N-point DFT data (FIG. 7).

2. Apply a frequency ($\epsilon'$) and phase offset ($\varphi'$) to this sub-set of the frequency domain data (Equation (1)).

3. Calculate the objective function J by summing across the available sub-carriers and symbols (Equation (3)).

4. Sweep through the possible frequency and phase offsets and repeat steps 2-3 until a global maximum or minimum is found to the required level of precision. The global maximum will give the ideal frequency and phase offsets while the global minimum occurs at the same frequency as the global maximum but at a phase offset shifted by $\pi/4$ radians.

Frequency and Time Domain Method (Labeled 416 in FIG. 4)

In this third method, data is again tapped out from the SC-FDMA receive chain in the frequency domain (FIG. 4) and as with the frequency domain method, frequency and phase offsets are applied to the sub-set of the N-point DFT data as in Equation (1). Following this an M-point IDFT is performed to transform this frequency domain data back to the time domain in a similar manner that the M-point IDFT is used in the SC FDMA Rx chain. A correlation based objective function of this time domain signal is then generated as described in Appendix A (Equation (16)) which will be maximal (or minimal) at the correct frequency offset.

In procedural form:

1. Using the channel schedule select RBs corresponding to a single user from the N-point DFT data (FIG. 7).

2. Apply a frequency ($\epsilon'$) and phase offset ($\varphi'$) to this sub-set of the frequency domain data (Equation (1)).

3. Perform an M-point IDFT on this offset data.

4. Calculate the objective function S summing across the available time domain data.

5. Sweep through the possible frequency and phase offsets and repeat steps 2-4 until a global maximum or minimum is found to the required level of precision. The global maximum will give the ideal frequency and phase offsets while the global minimum occurs at the same frequency as the global maximum but at a phase offset shifted by $\pi/4$ radians.

A way in which this procedure could be incorporated into the Rx chain is shown as follows.

Figure 8A:
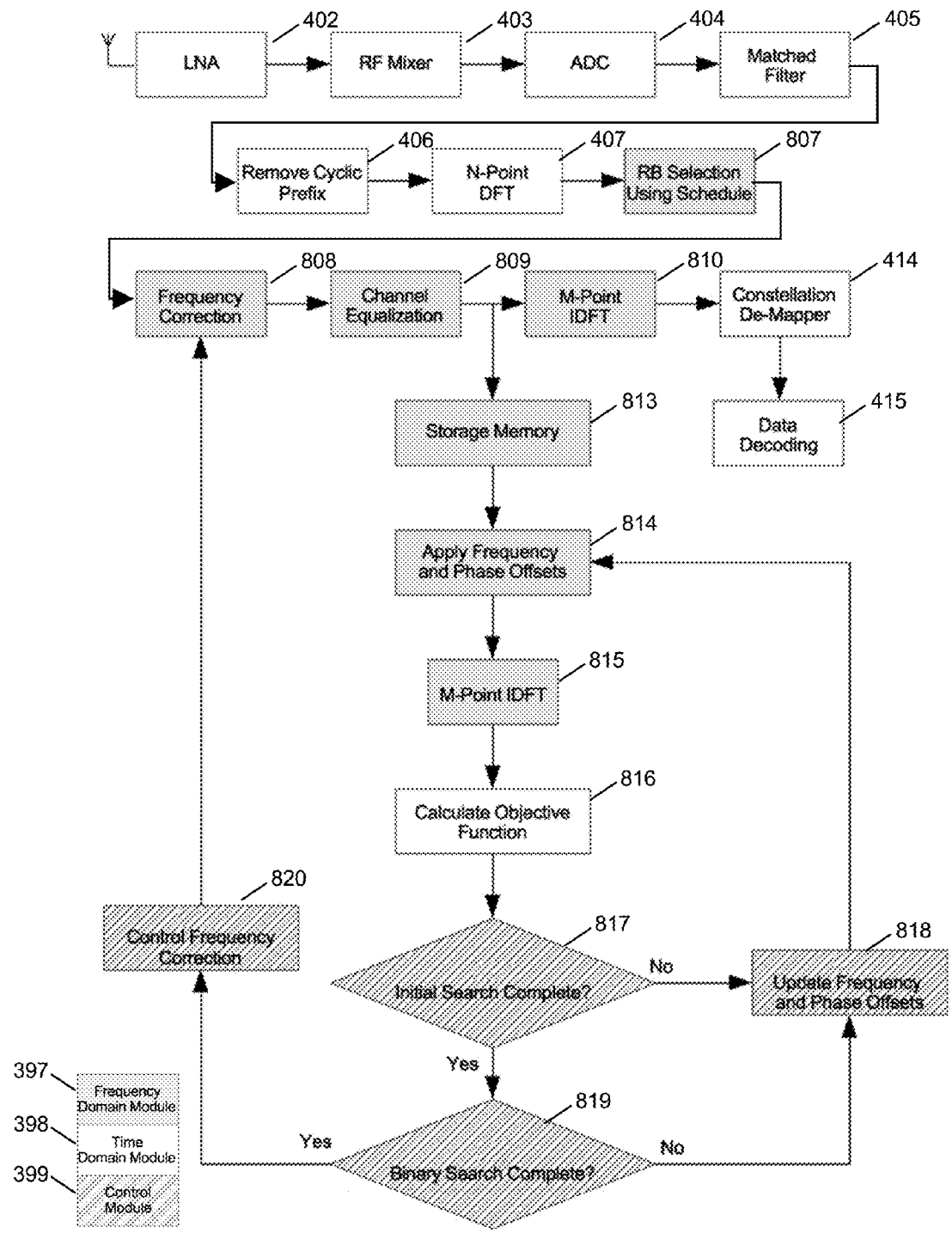
FIG. 8A is a flowchart/block diagram showing an SC-FDMA receive chain with frequency and phase offset correction, including an M-point IDFT inside a search loop.

FIG. 8A is a flowchart/block diagram showing an SC-FDMA receive chain with frequency and phase offset correction, including an M-point IDFT inside a search loop. The SC-FDMA receive chain showing the location of the data tap-out, and processing, for the frequency and time domain methods described herein, and where the correction may be implemented. Where figure identifiers are identical to those shown in FIG. 4, the same or equivalent modules are intended to be shown.

807 RB Selection Using Schedule: Selects resource blocks from the input that apply to or are transmitted from a particular UE.

808 Frequency Correction module: Performs frequency correction.

809 Channel Equalization: Performs equalization of channels.

810: M-point IDFT. This IDFT is always outside of any frequency and phase error processing loop, as it is required to provide a time domain signal to the constellation demapper 414.

813 Storage Memory: The frequency domain samples for a number of symbols from a single user are stored and it is these samples, or a subset thereof, to which frequency and phase offsets are applied.

814 Apply Frequency and Phase Offsets: Based on the time at which a given symbol was received a phase offset is applied to the samples as given in Equation (1).

815 M-Point DFT: This transforms the frequency and phase offset received data to the time domain.

816 Calculate Objective Function: With this time domain data, the correlation objective function, such as that given in (16) is calculated.

817 Initial Search: An initial search is conducted across the expected frequency range (for example from −1.5 kHz to +1.5 kHz) and phase range (0 to π/2) at widely separated positions in order to narrow down the search area.

819 Binary Search: Following the coarse initial search, a binary search may be performed to efficiently locate the global maximum to the required level of precision.

818 Update Frequency and Phase Offsets: Decides which values to use for the frequency and phase offsets in the next iteration of the search, depending on the search progress.

820 Control Frequency Correction: When the frequency and phase offsets generating the global maximum of the objective function have been determined to the required level of precision, these are sent to the frequency correction module 808 and used to fine tune the received signal from a given user.

Figure 8B:
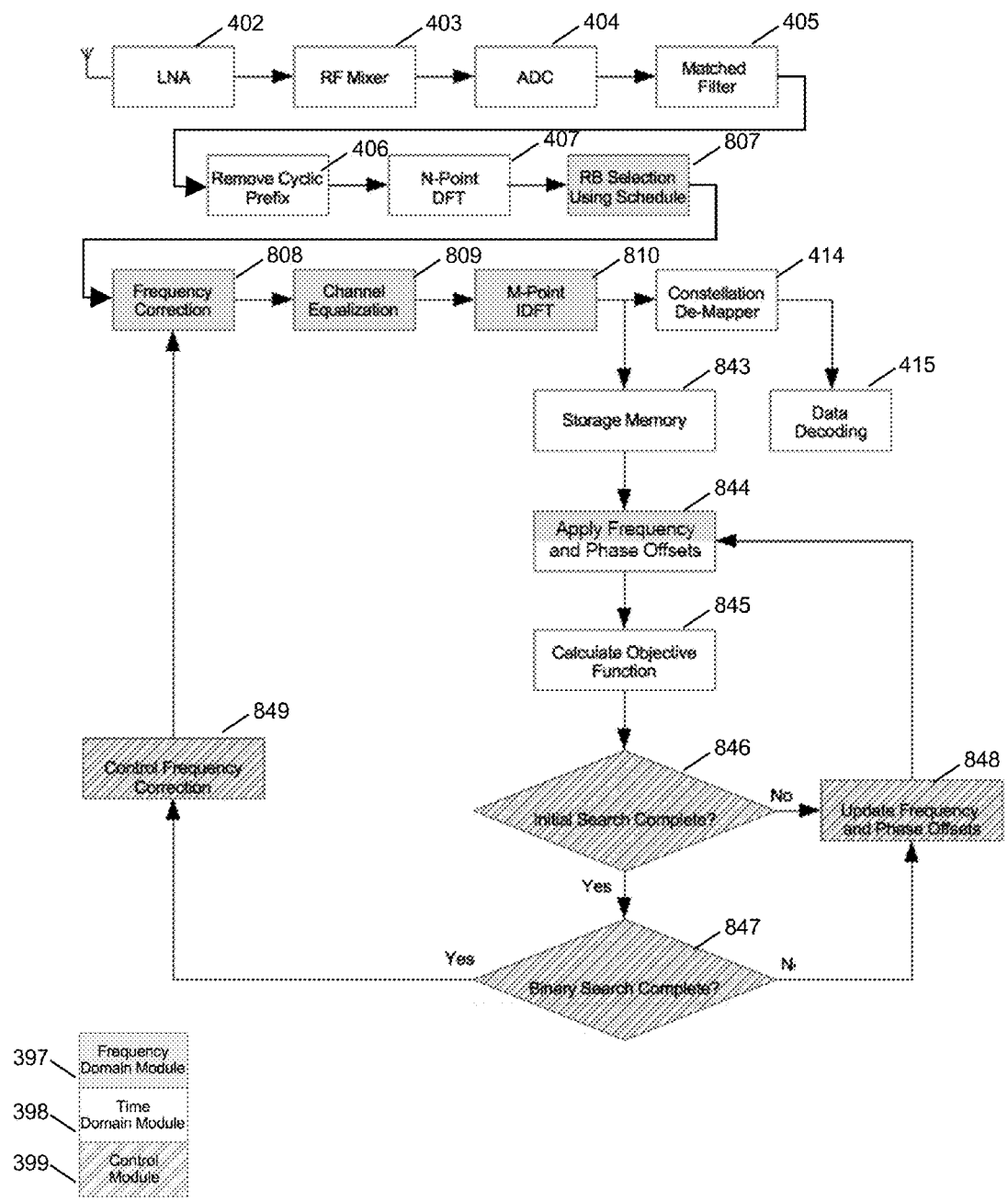
FIG. 8B is a flowchart/block diagram showing an SC-FDMA receive chain with frequency and phase offset correction, with an M-point IDFT outside a search loop.

FIG. 8B is a flowchart showing an SC-FDMA receive chain with frequency and phase offset correction, with an M-point IDFT outside a search loop.

Note that the M-Point IDFT 815 can be taken outside of the search loop by considering the final M time domain samples from an SC-FDMA symbol to have occurred at the symbol time, $t_l$, and have a single sub-carrier frequency corresponding to the center of the symbol's RB, $k_l$ in Equation (5) which is otherwise similar to Equation (1) except that the M samples in each of the l symbols are now time domain samples, $r_l$, rather than frequency domain, $R_{(l,k)}$.

$$U(l, \varepsilon', \varphi') = e^{-j\left\{2\pi t_l \varepsilon'\left(1 - \frac{k_l}{N}\right) - \varphi'\right\}} r_l \quad (5)$$

where $k \in \left[-\frac{N}{2}, \frac{N}{2} - 1\right] \cap \mathbb{Z}$ ; $l = 1, 2, \ldots, N_{RB} \times N_{SPS}$ By moving the IDFT outside of the loop, the number of calculations required to complete the search is reduced.

Whereas FIG. 8A shows the M-point IDFT inside the search loop, FIG. 8B shows the M-point inverse discrete Fourier transform (IDFT) outside of the search loop. Having the IDFT outside of the loop reduces the calculations required to evaluate the correlation result and so may speed up the calculation when implemented in hardware/software. No difference was observed in terms of the quality of the final search result in terms of the accuracy of the frequency or phase offset, so this design provides the benefit of reduced complexity.

In FIG. 8B, Module 844 is shown as applying frequency and phase offsets both in the frequency domain and the time domain. While module 814 applies the offsets in the frequency domain and while module 844 performs its processing primarily in the time domain, module 844 applies offsets to the signal based on the frequency of the resource block from which the I,Q samples came, so may be considered to operate in the frequency domain as well, since while it applies frequency and phase offsets in the time domain, it uses the frequency domain history of the data to do so.

Advantages of the New Methods

These new methods use the same radio hardware found in typical communications networks and the digital domain processing can be directly implemented in equipment supporting the LTE standard for example:

In a downlink channel, the OFDM method, described at length in Appendix B and similar to the frequency domain method, can be implemented in the MS receiver.

In an uplink channel, the methods described above, such as the hybrid frequency-time domain method described herein, can be implemented in the BS receiver.

Due to their ability to use any form of quadrature modulated data they are not dependent on training signals, pilots or beacons for example and can use regular payload data as well as equalization signals such as the DRS in LTE.

How measurements are performed can be adjusted based on the environment, for example the MS speed relative to the BS; when both are stationary, data from multiple time slots can be aggregated to increase the accuracy of frequency offset. When a mobile station is moving fast, shorter amounts of data can be used to estimate frequency offset including Doppler Shift with only slight degradation. Even in the case of large Doppler Shifts, our method is much more accurate than MS-only synchronization and allows higher data throughput at higher speeds or increased service availability in the cell range.

The frequency offset of multiple users can be extracted from the same received signal by an LTE BS and correcting for this can allow individual users to employ higher data rates and improve system data throughput and bandwidth efficiency.

Appendix A: RF Carrier Synchronization and Phase Alignment Methods

RF Carrier Synchronization and the Phase Alignment Methods described here have been previously documented in U.S. Pat. No. 9,048,980 B2 and U.S. Pat. No. 9,048,979 B2, each of which is hereby incorporated by reference in its entirety for all purposes. The theoretical background of this method, which is included in these original patents, has been re-summarized in this section with some updated elaboration on its application and implementation details.

The Synchronization Technology described here is a blind synchronization technique that requires no pre-defined symbols such as pilots embedded in the QAM constellations. Instead, it makes use of the fundamentally uncorrelated and orthogonal nature of the two quadrature signals, namely the in-phase (I) and quadrature-phase (Q) signals that are modulated with a radio frequency carrier waveform.

In particular, we make use of the orthogonal nature between a function of I and a function of Q, such as $\{I\_R(t)\}^2$ and $\{Q\_R(t)\}^2$, we define:

$$A \triangleq \{I_R(t)\}^2 \text{ and } B \triangleq \{Q_R(t)\}^2 \tag{6}$$

With mean values $\mu_A$ and $\mu_B$ respectively. Their cross-covariance can then be expressed as follows:

$$C(A, B) = E\{(A - \mu_A)(B - \mu_B)\} \tag{7}$$

$$= E\{AB\} - \mu_A E\{B\} - \mu_B E\{A\} + \mu_A \mu_B \tag{8}$$

$$= E\{AB\} - \mu^2 \tag{9}$$

With the assumption that:

$$\mu = \mu_A = \mu_B$$

After some mathematical manipulation of the above expressions and taking into account the orthogonal nature of the A and B, we find:

$$E\{AB\} = \mu^2 \cdot E\left\{\frac{1 + \cos(4\varepsilon t)}{2}\right\} \tag{10}$$

As expected when there is no synchronization error (i.e., $\varepsilon=0$), the cross-covariance goes to zero since $E\{AB\}=\mu^2$. However, when $\varepsilon \neq 0$ Equation (10) tells us that the cross-covariance of $I^2(t)$ and $Q^2(t)$ is time-dependent and it oscillates due to $\cos(4\varepsilon t)$ term. This mathematical derivation and observation provide the basis for the high-precision synchronization technology described in this document.

As a slight variant to above approach, we could re-define A and B to be different functions to those given in Equation (6), such as the absolute function, so that:

$$A \triangleq |I_R(t)| \text{ and } B \triangleq |Q_R(t)| \tag{11}$$

This will yield effectively the same result with a slight change in the cross-covariance expression as follows:

$$C(A, B) = E\{AB\} - \mu^2 E\{AB\} \tag{12}$$

$$= \mu^2 \cdot E\{|\cos(2\varepsilon t)|\} \tag{13}$$

Different functions will lead to different shapes of the correlation profile, for example increasing the power to which I and Q are raised will sharpen the peak of the surface and smooth the trough, and reducing the power, even to fractional values will have the opposite effect, smoothing the peak and sharpening the trough. Different functions can be used for A and B that will produce a similar correlation result. For example, if $A \triangleq |I_R(t)|$ and $B \triangleq \{Q_R(t)\}^2$ the maximum of C(A,B) will still correspond to the frequency offset.

High-Precision Synchronization Procedure

Noting that the only non-constant term of the cross covariance expressed in Equation (9) is $E\{AB\}$ term as re-written below:

$$E\{AB\} = E\{(I_R(t))^2(Q_R(t))^2\} = \mu^2 \cdot E\left\{\frac{1 + \cos(4\varepsilon t)}{2}\right\} \tag{14}$$

we would like to choose a sufficiently long observation window, $\Delta T$ in order to observe sufficient changes in cos $(4\varepsilon t)$ term. If we choose $4\varepsilon \cdot \Delta T = \pi/2$ and $\varepsilon = 200$ Hz for example, then, we have:

$\Delta T = \pi/8\varepsilon = \pi/(8(200)) = 1.96$ msec

If we are to sample our de-modulated baseband signal at 100 MHz for 1.96 ms of observation window, this translates to 196350 samples.

If we take the alternative definition of A and B as in Equation (11), the non-constant term is:

$$E\{|I_R(t)| \cdot |Q_R(t)|\} = \mu^2 \cdot E\{|\cos(2\varepsilon t)|\} \tag{15}$$

Then, for $2\varepsilon \cdot \Delta T = \pi/2$ we will need 392700 samples. Although the latter case requires twice the sample size it does not require squaring operation of the samples as in former case. From here on, we will use the latter case to illustrate the implementation methodology.

Let us assume that our received RF signal is at 2 GHz and its down conversion at the receiver was done using a frequency source with an accuracy of 100 parts per billion. This translates to a frequency error, $\varepsilon$, in the range of $-200$ Hz to $+200$ Hz. We can now try to determine the precise frequency, or synchronization, error in the sampled data by applying frequency error correction to the sampled data in finite increments, between the assumed boundaries, while observing the cross covariance value. More specifically, we will observe the following value:

$$S(i) = \Sigma_{k=1}^N \{|I_{R,i}(k)| \cdot |Q_{R,i}(k)|\} \tag{16}$$

Where N represents the total number of samples, and S(i) represents the i'th frequency error correction performed on the original observation data. $I_{R,i}(k)$ and $Q_{R,i}(k)$ represent the original sampled data $I_R(k)$ and $Q_R(k)$ whose phase has been corrected with i'th frequency error correction value. For instance, if we were to increment the frequency correction by 20 Hz from $-200$ Hz to $+200$ Hz, there would be 21 sets of S(i) with i ranging from 1 to 21. If the actual frequency error was 122 Hz, then, the correction of 120 Hz will show the best correction resulting in highest S(i) value in the set.

Figure 9:
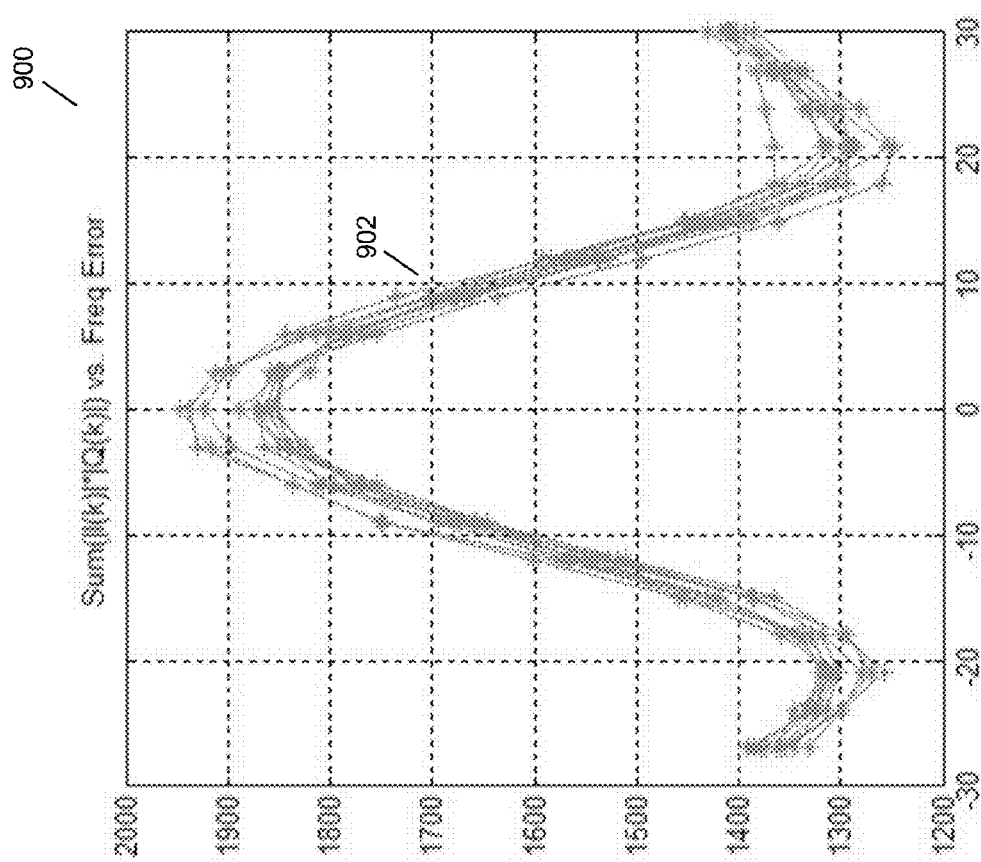
FIG. 9 is a correlation plot plot of an absolute value function of I and Q samples versus frequency error, in accordance with some embodiments.

Shown below are simulation results using a 64-QAM modulated signal with and without frequency error. First, FIG. 9 is a plot 900 showing 10 different plots 902 resulting from performing the correlation on 10 different sets of samples with no frequency synchronization error. Each plot of 20 correlation results, as a function of frequency offset, shows that as expected, the result is maximal when no additional frequency offset was applied—where the highest value means least correlation between |IR|&|QR|. The multiple plots (10 in total) are shown in the figures below to illustrate that the results are consistent given a random selection of data; as this method only relies on the statistical nature of the data for it is a blind synchronization method. The consistency of the results, despite the random selection of the data samples, is a consequence of the summation process described in Equation (16) achieving two necessary objectives:

Time-varying nature of the correlation between the quantity A and B as described in Equation (15) are traced, and its individual contributions are accumulated through summation.

Randomness of the instantaneous quantities of A and B are averaged out over time.

FIG. 9: Ten plots obtained from ten random data samples with no synchronization error. 20 incremental frequency adjustments were made to each data set from −27 Hz through 30 Hz in steps of 3 Hz. As expected no adjustment (mid-point) shows the best result consistently in all ten data samples—the highest value indicates the least correlation between |IR|&|QR|

Figure 10:
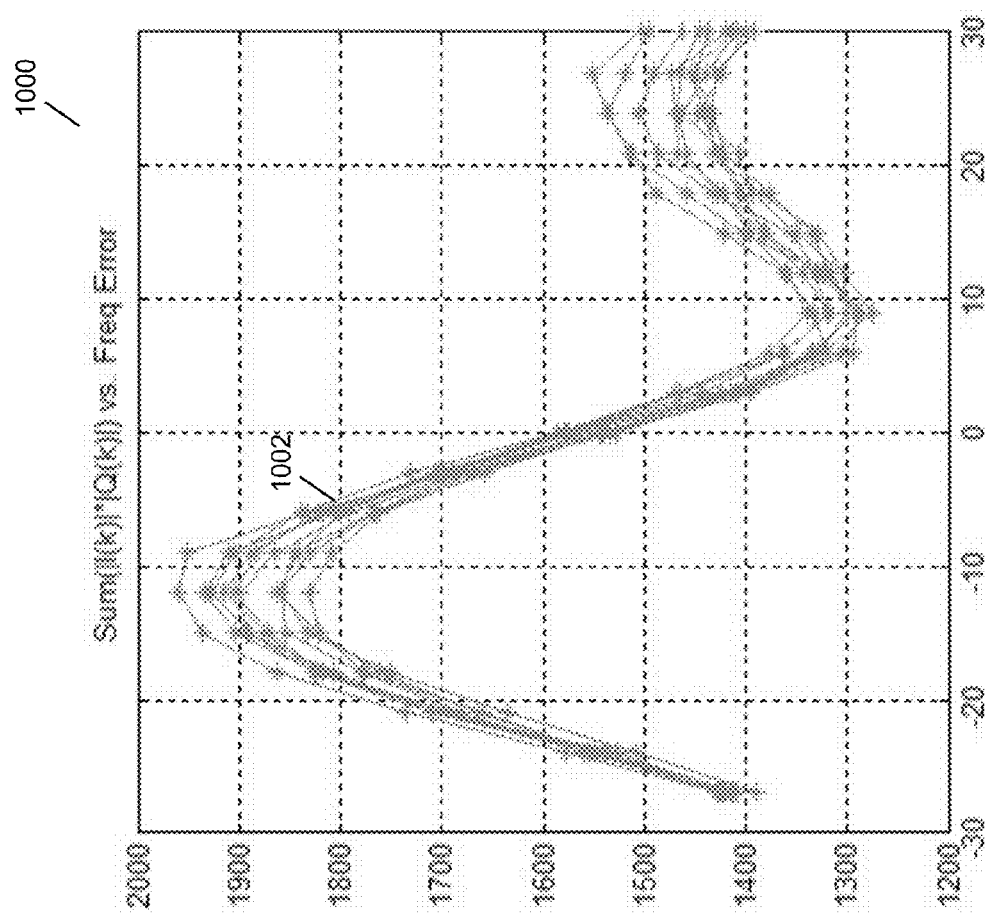
FIG. 10 is a second correlation plot of an absolute value function of I and Q samples versus frequency error, in accordance with some embodiments.

FIG. 10: Ten samples are taken with the synchronization error set to 12 Hz. Then −9 through +10 incremental frequency adjustments with 3 Hz step were applied to each sample. The results show that in all ten cases the best correction result occurred at −12 Hz.

FIG. 10 shows the results of a similar simulation where a finite synchronization error of +12 Hz has been added, instead of 0 Hz that gave the results in FIG. 9. Again, a plot 1000 is shown showing a total of 20 incremental frequency adjustments 1002 with a 3 Hz step were made for each set. All ten results consistently indicate that the sixth adjustment from left (−12 Hz) accomplishes the best synchronization error correction as indicated by the peak location which corresponds to the frequency offset that best cancels the applied error.

By taking progressively shorter steps in frequency in the region of the maximum we zoom in on the precise amount of frequency correction required. It may be noted that as the residual error decreases, the period of cos(2εt) in Equation (15) increases, which suggests that the number of samples used in the correlation should increase in order for the phase change in cos(2εt) to remain constant. Rather than using these increasingly long data sets, we could adjust the decimation factor applied to the samples so that the total time-span included in the data set can vary while the number of samples remains manageable. Simulations show better than one part per billion accuracy of synchronization can be achieved using this method even with high noise level and I-Q mismatches expected in real system.

If the desired outcome is to maintain an accurate offset of the existing clock source in the receiver, a precise frequency offset (or error in the reference crystal oscillator) can be extracted using this method and used to correct incoming data in the digital domain. On the other hand, if the final goal is to fine-tune the Voltage-Controlled Crystal Oscillator (VCXO) in the receiver we could simplify the necessary sampling and computation described above and just derive the direction in which the reference frequency needs to be corrected. A feedback loop such as a PLL can then be employed to fine-tune the control voltage of the VCXO, using this error signal and achieve the desired carrier synchronization.

Phase Alignment Technique

One implicit assumption made in the previous section is that at the beginning of the observation window (t=0) we have perfect phase alignment (no initial phase offset on the I-Q plane). In reality the demodulated complex signal (I+j*Q) contains a phase offset as well as the frequency offset that we are trying to correct. However, it turns out that the correlation behavior of the sampled data set described above also provides information on the initial phase offset. When there is zero initial phase offset at time t=0, the tabulated data set, S(i) in Equation (16) exhibits maximum value with vertical symmetry about the i'th set that represents the least correlation (or the correct frequency offset value). This is because the correlation expressions shown in Equations (10) and (13) are even functions with peaks occurring at the center. However, if there is a phase offset at t=0, this vertical symmetry is lost as the simulation results given below in FIG. 11 and FIG. 12 illustrate.

Figure 11:
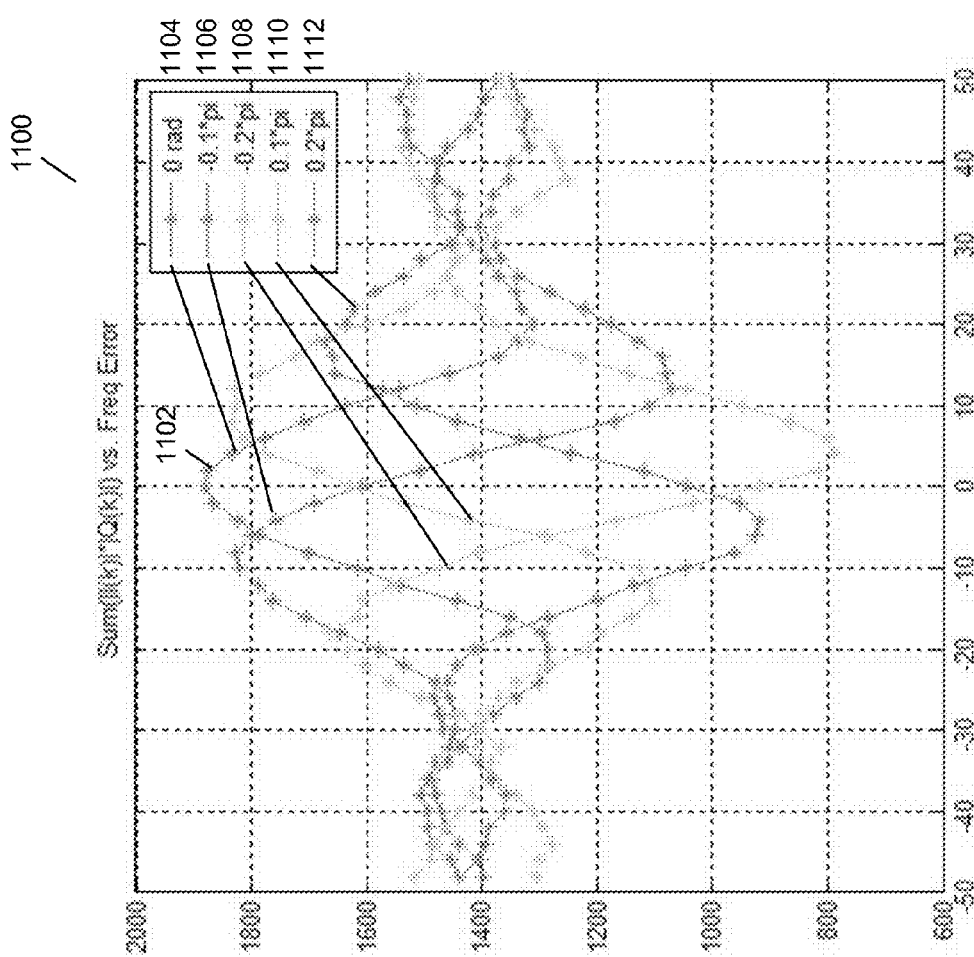
FIG. 11 is a correlation plot of an absolute value function of I and Q samples versus frequency error showing multiple phase offsets, in accordance with some embodiments.

FIG. 11 is a correlation plot 1100 with phase offset using data samples without synchronization error. As expected without phase offset (1102) the maximum value occurs when no frequency correction is made (mid-point) and the overall plot maintains symmetry about y-axis (vertical symmetry). However, with phase offset the peak value occurs at a wrong correction value and the overall plot does not show this vertical symmetry.

Figure 12:
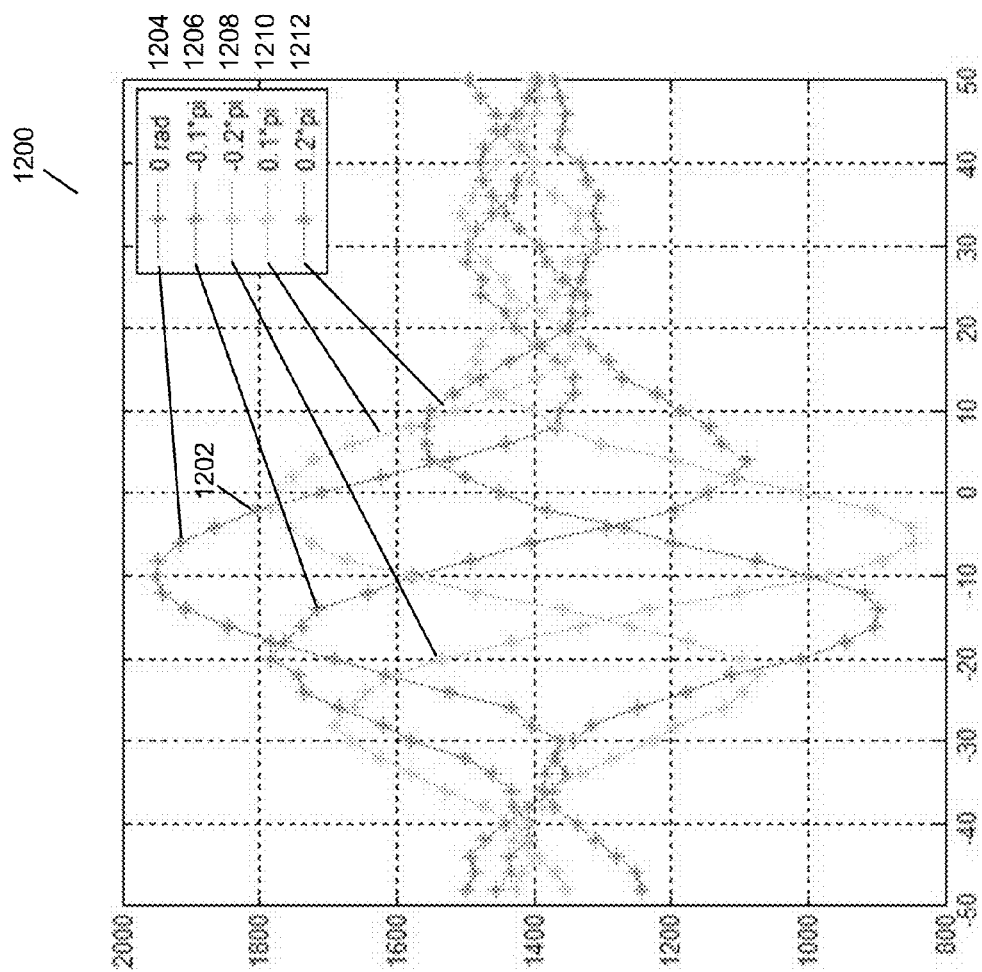
FIG. 12 is a second correlation plot of a function of I and Q samples versus frequency error showing multiple phase offsets, in accordance with some embodiments.

FIG. 12 is a correlation plot 1200 with phase offset using data samples with a given synchronization error of 10 Hz. As expected without an initial phase offset (1202) the maximum value occurs when the correct frequency correction is made (x=−10) and the overall plot maintains vertical symmetry centered at x=−10. However, with non-zero phase offset the peak value occurs at a wrong correction value and the overall plot does not show vertical symmetry.

Taking advantage of this symmetry behavior, we can accomplish both phase alignment and frequency synchronization at the same time. After obtaining the tabulation of frequency error correction on the sampled data set, first we need to adjust phase offset of the data set until the symmetry is established. This is a fairly straightforward procedure that requires sweeping the phase between 0 and π/2 until the correlation profile exhibits this expected symmetry. The symmetry repeats as the phase change reaches π/2 because I and Q are offset by π/2. In order to accomplish the correct frequency synchronization, we have to perform phase alignment using this procedure also. As the frequency error, ε gets smaller through each iteration, the required phase alignment gets smaller as well.

In addition to this vertical symmetry, it is also worth noting from FIG. 11 and FIG. 12 that the maximum value of S(i) in Equation (16) occurs when the correct phase and frequency offset are applied corresponding to the maximum of the blue line in both plots. Deviation from this point gives a smaller value of S(i). Consequently, the objective function that was considered a function of frequency offset only (S(i) in Equation (16), with i indexing the frequency offsets to search), can be considered to vary with the applied phase offset also:

$$S(\varepsilon,\varphi)=\Sigma_t |\text{real}\{R(t)e^{-i(2\pi\varepsilon t+\varphi)}\}||\text{imag}\{R(t)e^{-i(2\pi\varepsilon t+\varphi)}\}| \quad (17)$$

Where ε is the applied frequency offset (in Hertz) and φ is the applied phase offset (in Radians). R is the received time domain signal.

Figure 13:
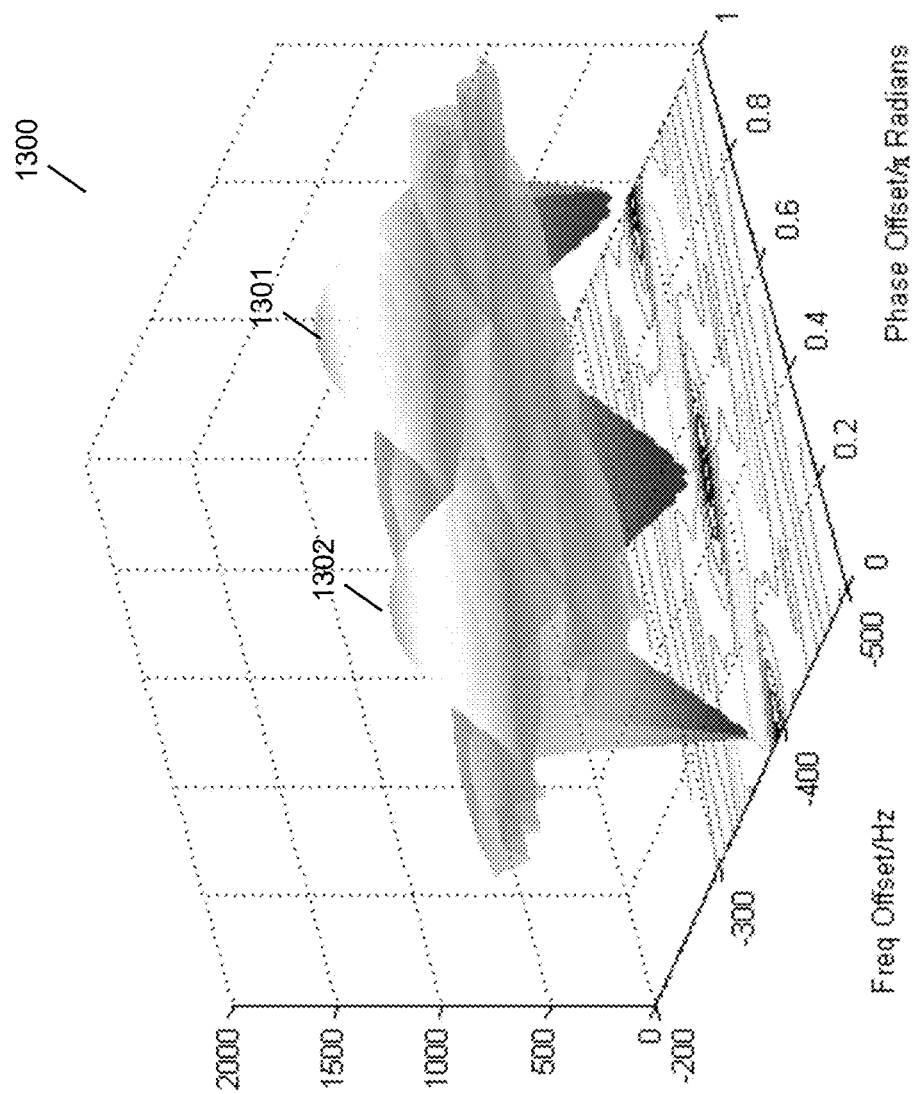
FIG. 13 is a third correlation plot of a surface as a function of I and Q samples, in accordance with some embodiments.

Another way to view our task at hand is to consider S(ε, φ) as the three-dimensional surface that is a function of the two orthogonal variables of phase and frequency offset, as shown in FIG. 13. Then our goal becomes simply to find the maximum point over this three-dimensional plot 1300. Various well-known peak search algorithms, such as the gradient descent algorithm or a modified Newton-Raphson algorithm, can then be used to find the local maximum in this case. This task can also be implemented by sweeping through the phase offset value and the frequency offset values. It is worth noting that the minimum of the surface occurs at the same frequency offset as the maximum but offset by a phase difference of π/4; and that depending on the choice of functions A and B (taking the square in Equation (6) and taking the magnitude in Equation (11)), and the search algorithm implemented, finding the minimum will give a more precise value for the frequency and phase offsets than searching for the maximum.

While the phase range to search may be limited to π/2 (as this is the periodicity of S(ε,φ) in the phase direction), the frequency range to be searched is application dependent. For example, as mentioned above, if the frequency offset between a transmitter and receiver system is expected to be less than 100 ppb with a carrier frequency of 2 GHz, the frequency boundaries of the search in frequency can be set to −200 and +200 Hz to cover this ±100 ppb range. Widening the range unnecessarily may result in a slower search for the peak position.

FIG. 13: Correlation plot showing a global maximum at the point corresponding with the ideal frequency and phase offset, where the correlation product, $S(\varepsilon, \varphi)$, is a function of the frequency and phase offset. Note the periodicity in the surface, with the shape repeating every $\pi/2$ radians in the phase direction, resulting in two stationary points 1301 and 1302.

Angle of Arrival (AoA) Measurement Using Phase Alignment Technique

One attractive byproduct of obtaining the initial phase offset through above method is that it can also be used as an effective and efficient way of measuring Angle of Arrival (AoA) in a MIMO system. As a byproduct of conducting carrier synchronization as described above, the precise initial phase offset of each receive chain can be found. By comparing the phase offsets between the receivers in a multi-output system with a known antenna separation geometry, AoA can be easily calculated.

Flow Chart for Synchronization and Phase Alignment Procedure

Depicted below in FIG. 14 is an example implementation of a synchronization and phase alignment procedure. However, it is just one example and there can be many variants that implement the basic principles of taking advantage of the correlation behavior between I and Q in the presence of synchronization error as described in this document.

FIG. 14: Sample flow chart describing the carrier synchronization and phase alignment Procedure described above. This process can repeat continuously at a slow interval since tracking the frequency errors of reference crystal oscillators doesn't need to be fast. At step 1401, processing starts. At step 1402, initial N is decided. At step 1403, N samples are acquired. At step 1404, processing is performed as described elsewhere herein to determine the cross-correlation objective function based on the N acquired samples. At step 1405, if $\varphi$ is aligned, then processing proceeds to 1407, to adjust $\delta F$. Otherwise processing proceeds to step 1406, adjust $\varphi$, and processing returns to step 1404 to correct the phase offset before frequency offset is corrected. Continuing to step 1408, if $\varepsilon$<tolerance, the process is complete. Idling occurs at step 1409 until a sufficient amount of error is deemed necessary for additional correction. Otherwise, if $\varepsilon$>tolerance, then processing proceeds to 1410, which increases the number of samples to increase the accuracy of the synchronizing algorithm, and processing at 1403 continues immediately.

Appendix B: Blind Carrier Synchronization Method for OFDM Wireless Communication Systems The Blind Carrier Synchronization Method for OFDM Wireless Communication Systems as presented in U.S. Provisional Patent App. No. 62/203,750 [2], hereby incorporated by reference in its entirety for all purposes. The theoretical background of this method, which is included in this original patent, has been re-summarized in this section with some updated elaboration on its application and implementation details.

OFDM technology is widely used in wireless communication systems, such as WLAN, WiMax, DVB-T, LTE 4G networks due to its high spectrum efficiency and robust performance to against the multipath fading channel. However, an OFDM system is sensitive to the carrier frequency offset (CFO) and sampling frequency offset (SFO) present in the received signal that is a consequence of differences between the frequency, of the oscillators in the transmit and receive chains. In the IEEE 802.11g WLAN standard, the maximum possible frequency difference between compliant nodes is 50 ppm which equates to an offset of up to almost 125 kHz which has a severe impact on the data throughput if it is left uncorrected. OFDM systems employ various measures to mitigate the impairments of CFO and SFO, for example by monitoring known training and pilot sequences. However the inaccuracy with which these estimations are made is currently a major limitation on system performance.

Signal Model and Impact of CFO and SFO

Figure 15:
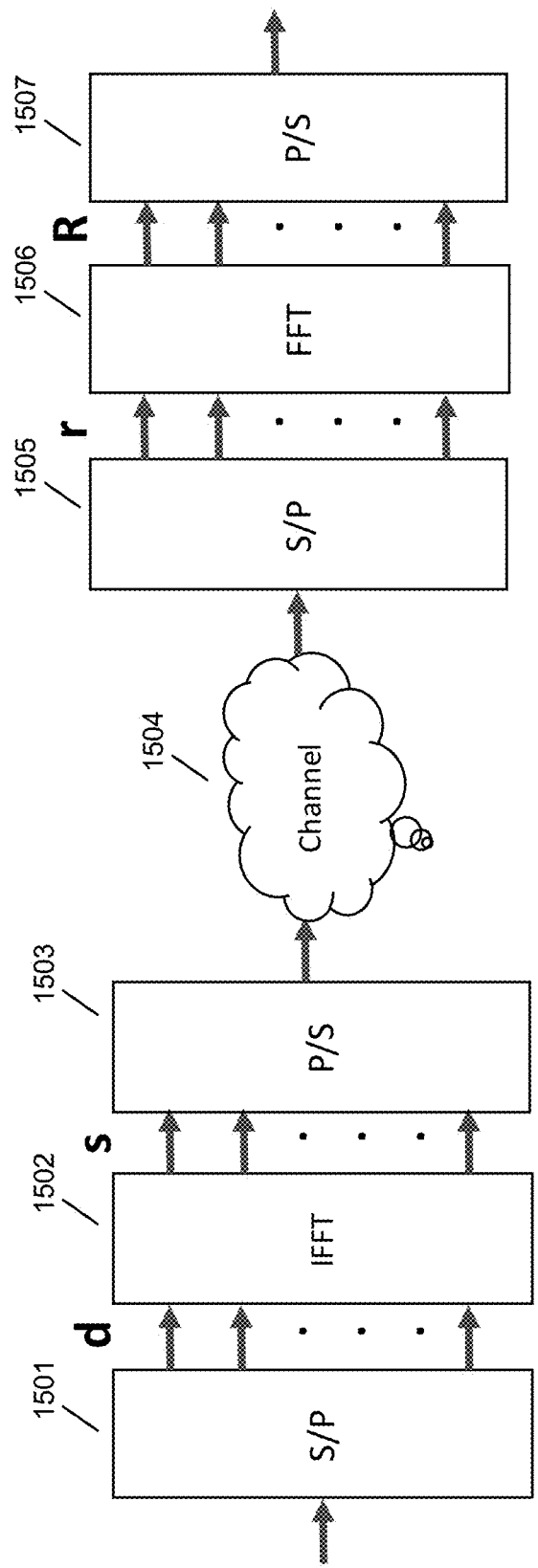
FIG. 15 shows an OFDM system block diagram, in accordance with some embodiments.

Consider an OFDM system as shown in FIG. 15:

FIG. 15: OFDM based system block diagram, showing the data flow, from serial to parallel (S/P) giving d followed by IFFT giving the data s, then serialized (P/S) and sent through a transmission channel to the receive chain where time domain data is once again partitioned into symbols, r, before being converted to the frequency domain by use of an FFT, R, then serialized once again for further processing, such as decoding.

FIG. 15 shows an OFDM system block diagram. S/P stands for serial to parallel conversion, FFT stands for Fast Fourier Transform, P/S stands for parallel to serial conversion, and IFFT stands for Inverse Fast Fourier Transform. Block 1501 is a serial-to-parallel block which receives a series of digital bits from over a digital interface from a computer or other digital device. S/P 1501 takes the original bits, which arrive already modulated (details not shown) in a single frequency domain stream, splits them into several digital streams, and sends them to inverse FFT block 1502.

IFFT 1502 takes a set of digital bits (a "block") in the time domain and applies an IFFT function, turning them into symbols in the time domain. Parallel to serial block 1503 takes the set of symbols from IFFT 1502 and multiplexes them into a single stream of symbols in the time domain using an OFDM modulation. The multiplexed single stream is sent over channel 1504, which may be an air interface such as Wi-Fi or LTE, to a receiver. Details of the receive and transmit chains, such as upconversion and downconversion to/from carrier frequency, amplification, antennas, etc. are omitted in this diagram.

On the receive side, serial/parallel block 1505 receives the output of an antenna and receive chain (not shown). The received signal is a series of symbols in the time domain. FFT 1506 takes the received signal and transforms it from the time domain to the frequency domain, then sends it to parallel to serial block 1507, which separates out the different frequency multiplexed symbol streams.

The sequence $d=[d_0\ d_1\ d_2\ \ldots\ d_{N-1}]$ is a sequence of complex numbers corresponding to the constellation points of data signals in the frequency domain. The output of the IFFT block is the time domain signal:

$$s(i)=\sum_{k=0}^{N-1} d_k e^{j2\pi ik/N};\ i=0,1,\ldots,N-1 \quad (18)$$

Where $d_k$ represents the data symbol applied to the k'th sub-carrier and N is the total number of sub-carriers. In the case of an AWGN channel without the effects of frequency offset, the received time domain signal can be expressed as:

$$r(i)=s(i)+n(i) \quad (19)$$

Where $n(i)$ is complex Gaussian noise. With ideal frame synchronization, the transmitted data symbols are recovered at the receiver using an FFT:

$$R(k)=\sum_{i=0}^{N-1} r(i) e^{-j2\pi ki/N};\ k=0,1,\ldots,N-1 \quad (20)$$

And so finally we have, $$R(k)=d_k+n_k; k=0,1,\ldots,N-1 \quad (21)$$

Where $n_k$ is the complex Gaussian noise addition to the original data symbol for the k'th sub carrier.

If the transmitter and receiver use local oscillators that differ in frequency, CFO and SFO will be present in the demodulated signal. CFO results from the RF mixers operating at different frequencies and SFO from differences in frequency between the digital to analog converter (DAC) at the transmitter and the analog to digital convert (ADC) at the receiver. The impact of these frequency offsets will now be explored.

In the presence of a CFO of $\Delta f_s$ and a SFO of $\varepsilon_s$ the time domain samples r(i) are given by:

$$r(i)=\Sigma_{k=0}^{N-1}d_k e^{j2\pi(k+\Delta fs)i(1-\varepsilon s)/N}; i=0,1,\ldots,N-1 \quad (22)$$

Where $\Delta f_s$ represents relative frequency offset normalized by fs/N, $\varepsilon_s$ represents the relative sampling frequency error $\varepsilon_s=(\Delta f_s)/N$ and fs is the sampling frequency. For the sake of simplicity, and as specified by the IEEE 802.11g standard, it is assumed that both CFO and SFO stem from the same frequency error. The method presented in this document can be easily extended to the case that both CFO and SFO are independent. Focusing on the impact of SFO, at the output of FFT, we have from [3]:

$$R(k) = e^{-j\pi\frac{N-1}{N}k\varepsilon_s} \frac{\sin(\pi k\varepsilon_s)}{\sin\left(\frac{\pi k\varepsilon_s}{N}\right)} d_k + n_k + \sum_{\substack{i=0\\i\neq k}}^{N-1} d_i \frac{\sin(\pi k\varepsilon_s)}{\sin\left(\frac{\pi[i(1+\varepsilon_s)-k]}{N}\right)} e^{-j\pi\frac{N-1}{N}i\varepsilon_s} e^{-\frac{j\pi(i-k)}{N}};$$

$$k = 0, 1, \ldots, N-1 \quad (23)$$

Three different effects can be observed from Equation (23):

An amplitude attenuation by factor $$\frac{\sin(\pi k\varepsilon_s)}{\sin\left(\frac{\pi k\varepsilon_s}{N}\right)},$$

The phase shift of symbol $d_k$ and

The inter-carrier interference (ICI) due to the loss of orthogonality between the sub-carriers which is represented by the third term.

Previous Work and Existing Methods

It should be noted that, in OFDM system, CFO produces the same phase drift at all subcarrier indices, while SFO introduces a phase rotation which increases linearly with the subcarrier index. The impact of CFO and SFO are the loss of the orthogonality of the subcarriers, which results in inter-carrier interference (ICI) and the rotation of constellation points. To mitigate the impact of CFO and SFO, a two-step process is normally used. First CFO and SFO are estimated, and then second, an attempt is made to remove these offsets from the signal.

There are three major methods for CFO, SFO estimation as described in [4]:

Cyclic prefix (CP)-based; the performance of this method is limited by the length of the CP and the delay spread of the multipath channel.

Pilot-based; the pilot signals can be inserted at the beginning of each data frame or scattered throughout the frame. The problem with this method is that, because the pilot signals are just a small portion of the symbol, it always takes several tens of OFDM symbols for the tracking loop to converge.

Decision-directed (DD); one problem with this method is that when the SFO is large, hard decisions from the constellation de-mapper become increasingly unreliable, so an estimate of the offset is obtained following decoding and re-constructing the symbol; which requires more data buffer memory and increased computation complexity.

Generally speaking, there are two methods to apply this estimation and so correct the CFO/SFO.

The first method is interpolation/decimation. The CFO/SFO is corrected by resampling the base-band signal in the time domain. The problem of this method is that the complexity and hardware requirements are too high for high-speed real time broadband applications.

The second method is to apply the correction in the frequency domain by applying rotations to the data constellations. The basis for this method is suggested above, that is, CFO produces a constant offset across all sub-carriers and SFO generates phase shifts that are linearly proportional to the subcarrier index in the frequency domain. The advantage of this phase rotation method is its low complexity; however unlike the first correction method it will not eliminate ICI.

The precision of these estimation methods is between 1 ppm to 100 ppb for moderate SNR values [5]. This level of precision may be sufficient for applications using relatively short data frames; however their effectiveness will be limited when it comes to supporting higher order modulations with long data frame that are possible in the more recent additions to the 802.11 standard. It is hitherto a fundamentally a difficult challenge achieving a high accuracy of CFO/SFO estimation and at the same time maintaining an acceptable level of complexity for the CFO/SFO correction in a high data rate OFDM communication system.

Following, the blind frequency synchronization algorithm will be described in detail. With the method presented, the CFO/SFO estimation error can be reduced to single digits of ppb in a realistic OFDM channel and so enables the realization of high data throughput OFDM systems.

Figure 16:
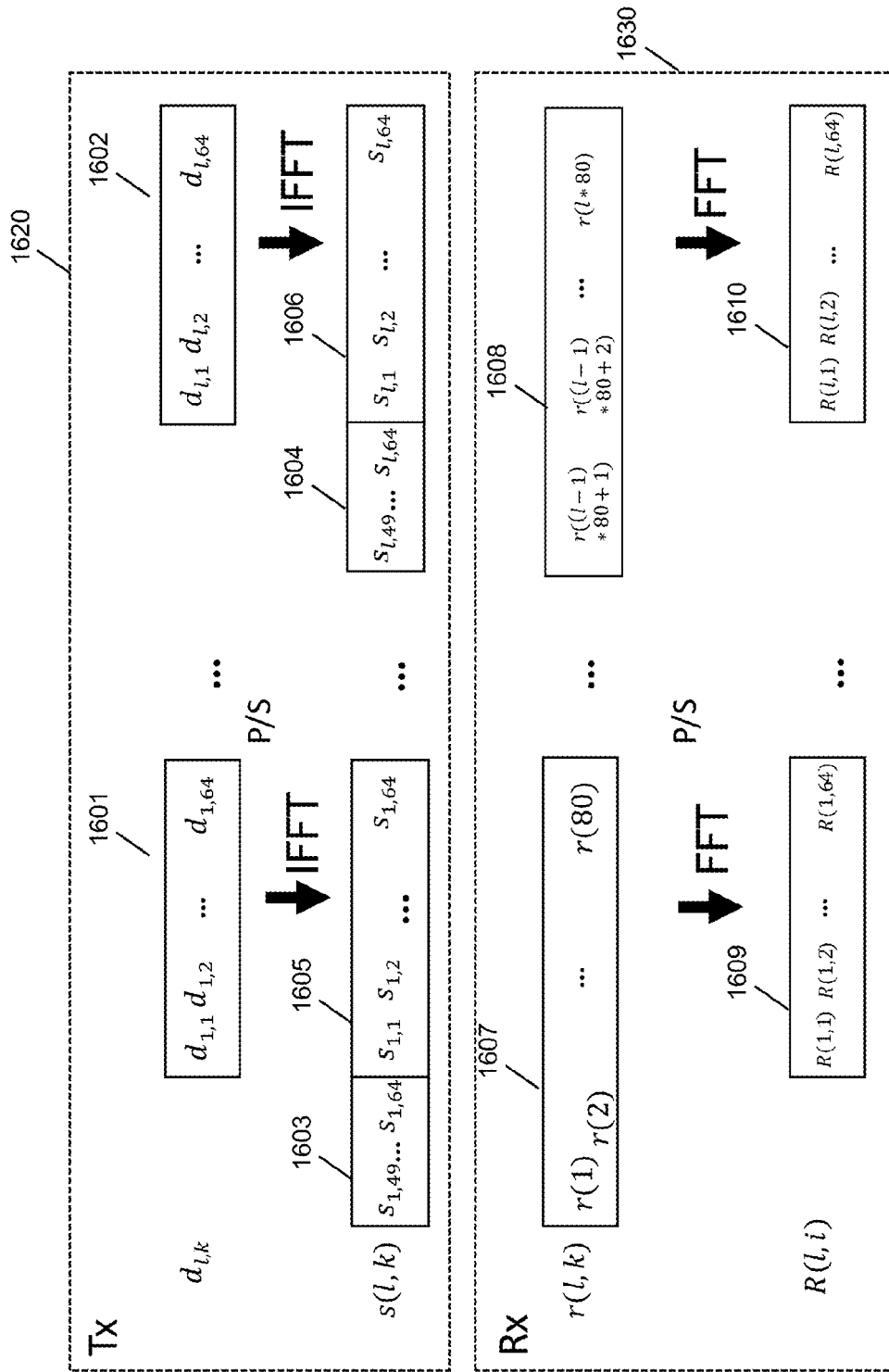
FIG. 16 shows a flow diagram through an OFDM system, in accordance with some embodiments.

FIG. 16 is a diagram showing data flow through an OFDM system, with 80 samples per symbol, of which 16 are the CP, as in the IEEE 802.11g standard, in accordance with some embodiments.

As shown in FIG. 16, we use IEEE 802.11g as an example to show signal processing flow in an exemplary OFDM system. Area 1620 represents a series of steps performed at a transmitting node and area 1630 represents a receiving node. Signal 1601 is a digital baseband frequency domain signal, numbered $d_{l,k}$, where l is the symbol number and k is a sample number. Signal 1602 is also a digital baseband frequency domain signal, where l is the symbol number and represents the last in a series of symbols from 1 to l. The value of l can be varied based on configuration of the system, with tradeoffs: without a sufficient number of symbols, synchronization may not be achieved to a desired level of accuracy, but processing more symbols requires greater sampling time and processing time.

At the transmitter side, frequency modulated signals $d_{l,k}=[d_{l,1} d_{l,2} \ldots d_{l,64}]$ are transformed to a time domain signal s(l,k), k=1, ..., 64, by IFFT, shown as samples 1605. The last 16 samples of s(l,k), 1603 are prepended at the front of the 64-sample block signal to form one OFDM symbol in the time domain. This operation allows for straightforward channel equalization in the frequency domain. Samples 1603, 1605 are a first symbol in the frequency domain and the time domain, respectively, and samples 1604, 1606 are an lth symbol in the frequency and the time domains, respectively.

At the receiver side, data sequence r(l,k) is received in time domain after ADC. R(l,i) is obtained after FFT based on frame synchronization information. Symbol 1607 in the time domain is 80 samples long due to a need for frame synchronization; after FFT into the frequency domain, transformed symbol 1609 is 64 samples long. Symbols 1607 and 1609 are a first symbol, i.e., l=1; symbols 1608 and 1610 are an lth symbol for the highest allowed value of l, in the time domain and the frequency domain, respectively. The coefficients of symbol 1608 reflect the fact that the total number of samples collected for any one iteration of the present offset detection/synchronization algorithm is l*80.

Assuming ideal frame synchronization and given that the sampling frequency is Fs, the FFT size is N, and that the effect of a frequency offset error of ε can be expressed as in [4], the frequency domain R(l,k) signal is:

$$R(l,k) = e^{-jv_l \varepsilon \left(1-\frac{k}{N}\right)} H_k d_{l,k} + W(l,k), \quad (24)$$
$$k=0,1,\ldots,63; l=1,2,\ldots,N_{ofdm}$$

Where $$v_l = \pi \frac{N-1+2N_l}{N};$$

$N_l=lN_s+N_g$; l is the OFDM symbol index, k is the subcarrier index; $N_g$ is the guard interval length with $N_s=N+N_g$ and $N_{ofdm}$ is the number of OFDM symbols in one data frame. In an IEEE 802.11g WLAN system, N=64 and $N_g$=16. $H_k$ is the component of the channel response at the frequency of the $k^{th}$ subcarrier. Again, we assume that both CFO and SFO arise from the same local oscillator error. Removing the constant phase rotation applied to every signal and the noise term, Equation (24) can be simplified to:

$$R(l,k) = e^{-j2\pi l N_s \varepsilon \left(1-\frac{k}{N}\right)} H_k d_{l,k}, \quad (25)$$
$$k=0,1,\ldots,63; l=1,2,\ldots,N_{ofdm}$$

For a given k=m, we can define a new sequence in time index of l by taking every 64th sample from R(l,i) as $$R(l,m) = e^{-j2\pi l \varepsilon_m} H_m d_{l,m}, l=1,2,\ldots,N_{ofdm} \quad (26)$$
$$\text{where } \varepsilon_m = \varepsilon N_s \left(1-\frac{m}{N}\right)$$

Since $\varepsilon_m$ is unknown, we can form a new sequence with a potential frequency offset of ε'. Define $\Delta\varepsilon_m = \varepsilon_m - \varepsilon'_m$ and $$\varepsilon'_m = \varepsilon' N_s \left(1-\frac{m}{N}\right).$$

Multiplying Equation 26 by $e^{j2\pi l \varepsilon'}$, we have $$U(l,m,\varepsilon') = R(l,m)e^{j2\pi l \varepsilon' m} = e^{-j2\pi l \Delta\varepsilon_m} H_m d_{l,m}, l=1,2,\ldots, \quad (27)$$
$$N_{ofdm}$$

Define $$I(l,m) = \text{real}(H_m d_{l,m}), Q(l,m) = \text{imag}(H_m d_{l,m}), l=1, \quad (28)$$
$$2,\ldots,N_{ofdm}$$

We have $$I_R(l,m,\varepsilon') = \text{real}(U(l,m,\varepsilon')) = I(l,m)\cos(2\pi l \Delta\varepsilon_m) - Q(l,m)$$
$$\sin(2\pi l \Delta\varepsilon_m),$$

$$Q_R(l,m,\varepsilon') = \text{imag}(U(l,m,\varepsilon')) = Q(l,m)\cos(2\pi l \Delta\varepsilon_m) + I(l,m)$$
$$\sin(2\pi l \Delta\varepsilon_m) \quad (29)$$

Defining an objective function as the following cross-covariance between $I_R(l,m,\varepsilon')^2$ and $Q_R(l,m,\varepsilon')^2$ as:

$$J(\Delta\varepsilon_m) = C(A,B) = \Sigma_l\{(A-\mu_A)(B-\mu_B)\}, \quad (30)$$

Where $$A=\{I_R(l,m,\varepsilon')\}^2 \text{ and } B=\{Q_R(l,m,\varepsilon')\}^2 \quad (31)$$

And $$\Sigma_l\{A\}=\mu_A \text{ and } \Sigma_l\{B\}=\mu_B \quad (32)$$

With the assumption that $\mu=\mu_A=\mu_B$ and following the same procedure in [1], we have:

$$J(\Delta\varepsilon_m) = \mu^2 \Sigma_l \left\{\frac{1+\cos 8\pi \Delta\varepsilon_m l}{2}\right\} - \mu^2 \quad (33)$$

The cross-covariance of $J(\Delta\varepsilon_m)$ becomes zero when $\Delta\varepsilon_m=0$, which from Equation (25) implies that ε'=ε.

In a similar way, we can define the objective function as:

$$J(\varepsilon') = \Sigma_m J(\Delta\varepsilon_m) \quad (34)$$

In Equation (34), the summation is made over all non-empty bin indices; in an IEEE 802.11g system, 52 out of 64 available frequency bins are used. We can fully use all the data from the available bins in the frequency synchronization procedure.

Equation (33) can be rewritten so as to find $\varepsilon_m$ which maximizes $$\max_{\varepsilon_m} J_1(\Delta\varepsilon_m) = \Sigma_l\{AB\} = \mu^2 \Sigma_l \left\{\frac{1+\cos 8\pi \Delta\varepsilon_m l}{2}\right\} \quad (35)$$

The objective function will achieve its maximum value when $\varepsilon'_m=\varepsilon_m$. In the same way, Equation (34) can be rewritten as:

$$J(\varepsilon') = \Sigma_m \Sigma_l\{AB\} \quad (36)$$

Where l is the index for OFDM symbols, and m is the subcarrier index within each OFDM symbol.

The operations of Equation (36) are illustrated in the FIG. below.

Figure 17:
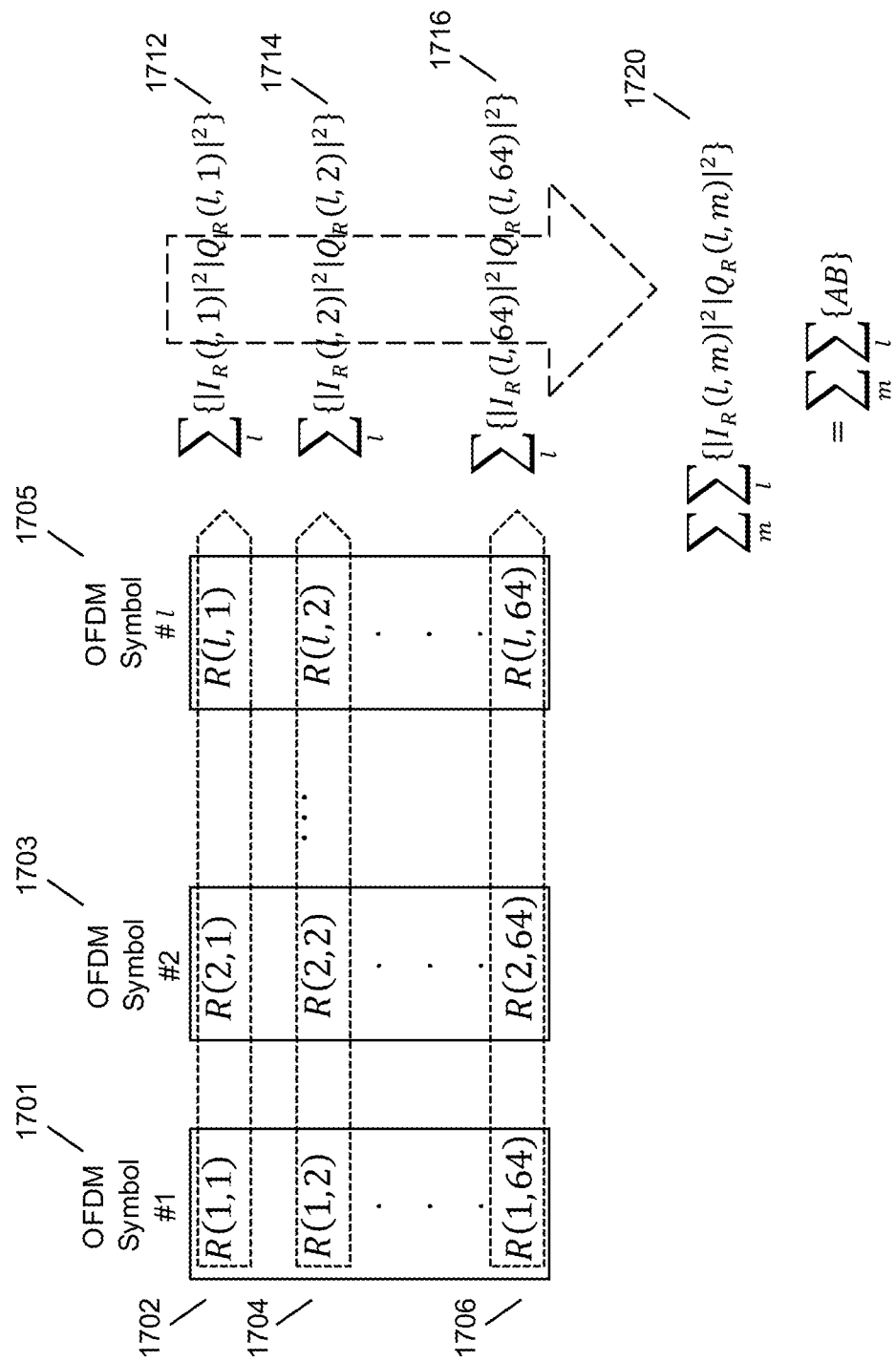
FIG. 17 shows a flowchart of application of a summation method in an OFDM system, in accordance with some embodiments.

FIG. 17 is a schematic illustration of the operations of equation (36), in accordance with some embodiments. OFDM symbol #1 1701 is made up of multiple frequency subcarriers 1702, 1704, 1706, with subcarrier 1702 having subcarrier number 1 and subcarrier 1706 having subcarrier number 64, the highest subcarrier number in this diagram.

Similarly, OFDM symbol #2 1703 and all symbols up to and including OFDM symbol #1 1705 are also made up of 64 subcarriers.

On the right of the diagram, equation 1712 reflects the fact that the squared absolute values (i.e., the cross-correlation according to Park) of every symbol having subcarrier number 1 are summed. Equations 1714 and 1716 reflect the summation of cross-correlations of every subcarrier across each OFDM symbol, with equation 1720 reflecting the summation of cross-correlations across both every subcarrier and every symbol. In some embodiments, squared absolute values may be used; in other embodiments, absolute values may be used without squaring, according to Park.

The variations of Equation (36) can be written as:

$$\max_{\varepsilon' \in [f_1:f_2]} J(\varepsilon') = \Sigma_m \Sigma_l \{AB\} = \Sigma_m \Sigma_l \{I_R(l,m,\varepsilon')\}^2 \{Q_R(l,m,\varepsilon')\}^2 \quad (37)$$

Where [f1, f2] is the frequency range of interest. Equation (37) can be rewritten as:

$$\max_{\varepsilon' \in [f_1:f_2]} J(\varepsilon') = \Sigma_m \Sigma_l \{AB\} = \Sigma_m \Sigma_l |I_R(l,m,\varepsilon') Q_R(l,m,\varepsilon')|^2 \quad (38)$$

Equation (38) is equivalent to maximizing following two objective functions:

$$\max_{\varepsilon' \in [f_1:f_2]} J(\varepsilon') = \Sigma_m \Sigma_l |I_R(l,m,\varepsilon') Q_R(l,m,\varepsilon')| \quad (39)$$

$$\max_{\varepsilon' \in [f_1:f_2]} J(\varepsilon') = \Sigma_m \Sigma_l |I_R(l,m,\varepsilon')||Q_R(l,m,\varepsilon')| \quad (40)$$

As in Appendix A, and as noted in Equations (6) through (13), the objective function can take a range of different forms. Taking the square or absolute value of I and Q will result in correlation surfaces (see FIG. 13 for an example) that although of different shapes, will have their maximums at the same frequency and phase coordinates. The objective function can then be adjusted somewhat to suit the search algorithm that is used.

Frequency Synchronization Procedure

Figure 18:
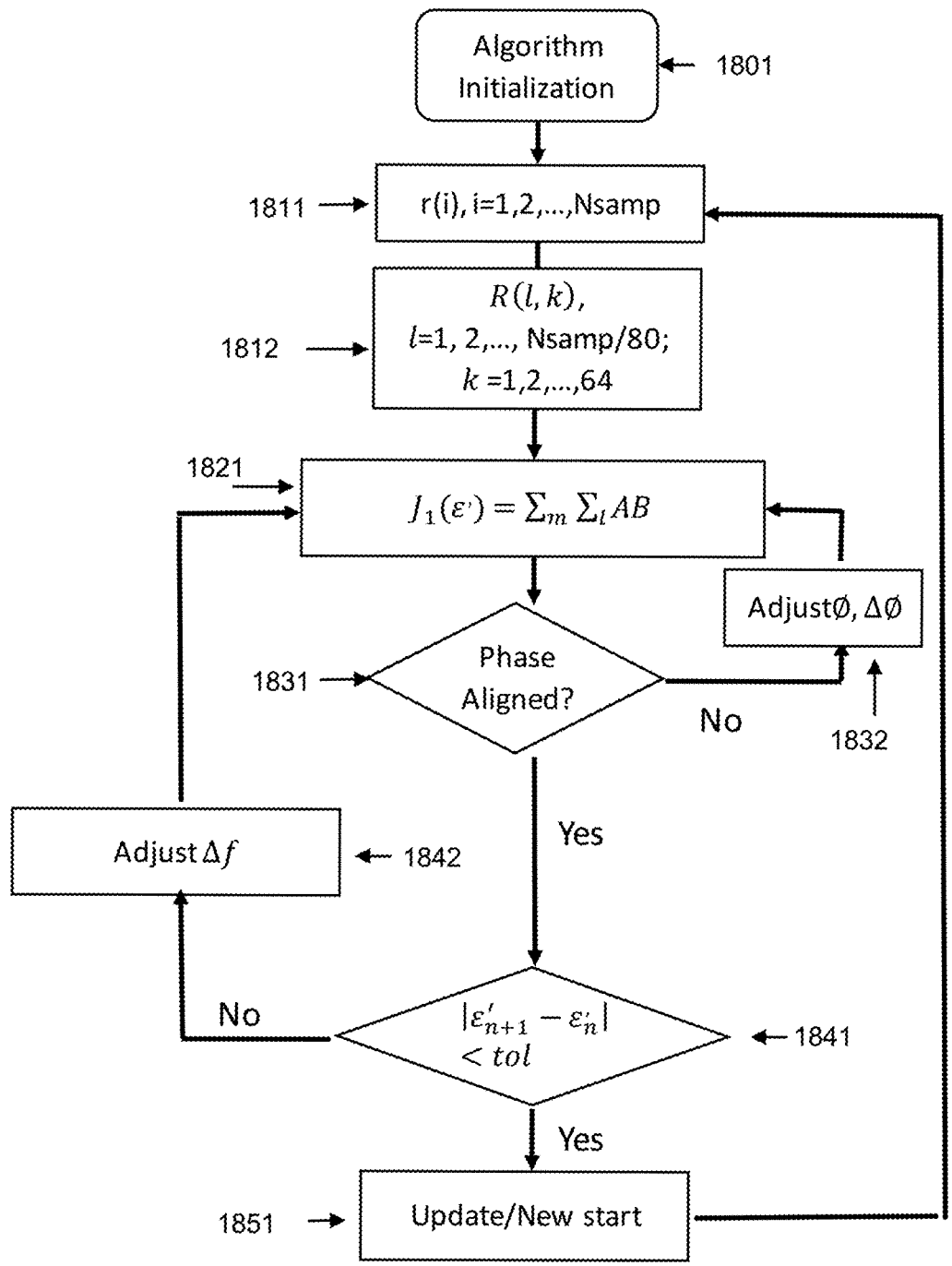
FIG. 18 shows a flowchart of frequency and phase synchronization, in accordance with some embodiments.

The following procedure, together with FIG. 18, describes a way in which the phase and frequency synchronization search may be performed.

FIG. 18 is a flow chart of a frequency and phase synchronization procedure, in accordance with some embodiments. The detailed frequency synchronization procedure is as follows.

At step 1801, the algorithm initialization function 501 defines the algorithm parameters used in synchronization process.

Nsamp is the total number of samples used in the synchronization process.

[f1 f2] is the target frequency range of frequency offset. For example, as mentioned above, the IEEE 802.11g standard defines a maximum permissible frequency offset at a node as 25 ppm. The maximum offset that a receiver may observe a transmitter to be adrift by is therefore 50 ppm which gives frequency bounds in the ISM band of approximately, f1=−125 kHz and f2=+125 kHz.

Δf is the step size for searching the frequency range of interest. These three numbers are adaptively reduced to minimize complexity of computation and meet accuracy requirements for specific communication systems.

Initial phase value. This is set to zero. In application, there always exists a constant phase difference between the transmitter and receiver in addition to the CFO and SFO. The phase difference is caused by the different sampling time at the transmitter and receiver, and air propagation. The phase difference sometimes also refers to the symbol timing and needs to be aligned at the receiver.

Δø is the step size for the phase. This number, like Δf, is adaptively adjusted. A larger value means faster alignment but with less resolution; the smaller the value, the higher the resolution and the greater the computation time. An efficient implementation will select a larger Δø at the initial phase alignment stage and progressively reduce Δø for improved precision, rather than using a fixed value throughout.

At step 1811, a signal of r(k) in equation (2) is acquired, which can be sampled at 1×, 2× or 4× of the basic sample rate at the ADC output in the receiver.

At step 1812, the time domain signal r(k) is converted into a frequency domain signal of R(l,i) by FFT operation based on frame synchronization information. l is the number of OFDM symbols within one data frame and i is the subcarrier index within each OFDM symbol.

At step 1821, firstly, the operation defined in equation (36) to cross over the number of OFDM symbols l and the subcarrier index i for the possible frequency range and defined step size is performed. The outputs of step 1821 are the maximum value of equation (36) and its associated frequency. Secondly, the phase alignment is rotated with equation (36) until a new max value occurs. Details regarding this phase alignment step are addressed in U.S. Pat. No. 9,048,979, Park. This summation across both all samples and all symbols expresses the use of cross-correlation or orthogonality to determine phase offset.

At step 1832, the direction of phase change and its resolution are tuned. The increase or decrease of phase value will be determined by the comparison between the max values of equation (20) with the differing phase value. For example, at the kth value of phase, if the max value of J1 is less than the max value of J1 at the (k−1)th phase value, the phase value will be decreased at the next round of search. ΔØ is the step size for the phase alignment process.

At step 1851, it is determined whether the synchronization process is complete. If the differences of (M) consecutive maximum values of equation (36) are less than a predefined threshold value, the synchronization process finishes. Otherwise, processing goes to circuit 1842 by reducing the frequency search resolution and performing the synchronization process using circuit 1821 again. A control operation is also performed to determine if an update is needed, or if a new synchronization process should be started. A new update or synchronization process may be performed, for example, upon power on of an antenna, upon connection to a new radio source, after a certain configurable time interval, or after other events that would be expected to produce de-synchronization.

This method can be viewed as a blind-synchronization method for both single carrier systems and for OFDM based systems, as it is not based on having a detailed knowledge of the data. For an OFDM system, only frame synchronization information is needed so that the FFT is performed on data belonging to a single symbol. The raw samples after the FFT can be used for frequency synchronization without a knowledge of the correct encoded data value.

Simulations show that the performance of our algorithm can be improved if channel equalization is performed when dealing with non-AWGN transmission channels. In most OFDM systems, an initial channel estimate can be generated by analyzing known sequences in the received signal, and this estimate used to equalize the frequency domain data. This equalization reduces, if not removes, the effects of the channel components, H_m, in Equation (26) and enables our algorithm to return high-precision CFO and SFO estimates.

Each of the below references is hereby incorporated by reference in its entirety for all purposes: Joshua C. Park, "RF Carrier Synchronization and Phase Alignment Methods and Systems," U.S. Pat. No. 9,048,980, Oct. 1, 2013 [1]; Jian Cui, Joshua C. Park "Blind Carrier Synchronization Method for OFDM Wireless Communication Systems," U.S. Provisional Patent App. No. 62/203,750, Aug. 11, 2015 [2]; M. Sliskovic, "Sampling frequency offset estimation and correction in OFDM systems", in IEEE-GlobalComm, vol. 1, 2001, San Antonio, pp. 285-289 [3]; Z. Gao, et al, "Self-Cancellation of Sample Frequency Offset in OFDM Systems in the Presence of Carrier Frequency Offset", IEEE VTC September 2010 Ottawa, Canada pp. 1-5 [4]; Y. Murin et al, "Efficient Estimation of Carrier and Sampling Frequency Offsets in OFDM Systems", IEEE WCNC' 14 April, 2014, Istanbul, pp. 440-445 [5].

From the foregoing, it will be clear that the present invention has been shown and described with reference to certain embodiments that merely exemplify the broader invention revealed herein. Certainly, those skilled in the art can conceive of alternative embodiments. For instance, those with the major features of the invention in mind could craft embodiments that incorporate one or major features while not incorporating all aspects of the foregoing exemplary embodiments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for blind carrier synchronization, comprising:
   applying, at a radio frequency (RF) signal receiver, an N-point discrete Fourier transform (DFT) to a received time domain signal to produce a frequency domain signal;
   using, at the RF signal receiver, a channel schedule to select portions of the frequency domain signal that correspond to signals received from a single user equipment (UE);
   applying, at the RF signal receiver, a first frequency offset and a first phase offset to the selected portions of the frequency domain signal to produce a frequency and phase offset corrected frequency domain signal;
   applying, at the RF signal receiver, an M-point inverse discrete Fourier transform (IDFT) to a frequency and phase offset corrected frequency domain signal based on the selected portions of the frequency domain signal to produce an intermediate time domain signal;
   computing, at the RF signal receiver, a correlation function of I and Q samples of the portions of the intermediate time domain signal over a range of frequency offset values and a range of phase offset values to iteratively search for a global maximum of the correlation function;
   identifying, at the RF signal receiver, the global maximum of the correlation function over the range of frequency offset values and the range of phase offset values; and
   applying, at the RF signal receiver, a final frequency offset and a final phase offset to the portions of the received time domain signal based on the identified global maximum.

2. The method of claim 1, wherein the method is performed in a frequency division duplexed system.

3. The method of claim 1, wherein the N-point DFT uses one of 128, 256, 512, 1024, 1536 or 2048 for N, and wherein the M-point IDFT uses 12 for M.

4. The method of claim 1, wherein the selected portions of the frequency domain signal are resource blocks received from the single user equipment (UE).

5. The method of claim 1, wherein the correlation function comprises computing a cross-correlation of received I and Q samples.

6. The method of claim 1, wherein the correlation function comprises computing a product of absolute values of received I and Q samples.

7. The method of claim 1, wherein the correlation function comprises $J(\varepsilon',\varphi')=\Sigma_k\Sigma_l\{AB\}$, wherein $A = |\text{real}\{U(l,k,\varepsilon',\varphi')\}|$ and $$B = |\text{imag}\{U(l,k,\varepsilon',\varphi')\}|,$$

$$\text{and } U\{l,\varepsilon',\varphi'\} = e^{-j\left\{2\pi t_l \varepsilon'\left(1-\frac{k}{N}\right)-\varphi'\right\}} r_l,$$

where $k \in \left[-\frac{N}{2}, \frac{N}{2}-1\right] \cap \mathbb{Z}$ and $l = 1, 2, \ldots, N_{RB} \times N_{SPS}$.

8. The method of claim 1, wherein the range of frequency offset values is from a carrier frequency multiplied by a factor of −0.00000005 to the carrier frequency multiplied by a factor of +30 0.00000005, thereby constituting 100 parts per billion expected error, and the range of phase offset is from 0 to π/2 radians.

9. The method of claim 1, wherein the method is performed using I and Q samples obtained over either a 10 ms period or over a single full Long Term Evolution LTE frame.

10. The method of claim 1, further comprising performing a coarse search of the correlation function and a subsequent fine granularity search of the correlation function, the subsequent fine granularity search further comprising a binary search.

11. The method of claim 1, further comprising performing a search of the correlation function by evaluating the correlation function at phase offset values of 0, 22.5, 45, and 67.5 degrees.

12. A method for blind carrier synchronization in a frequency division duplexed system using time domain data, comprising:
    applying, at a radio frequency (RF) signal receiver, at least one band pass filter to perform selection of portions of a received time domain signal that correspond to signals received from a single user equipment (UE) using a channel schedule;
    iteratively computing, at the RF signal receiver, a correlation function of I and Q samples of the portions of the received time domain signal over a range of frequency offset values and a range of phase offset values;
    identifying, at the RF signal receiver, a global maximum of the correlation function over the range of frequency offset values and the range of phase offset values; and
    applying, at the RF signal receiver, a final frequency offset and a final phase offset to the portions of the received time domain signal based on the identified global maximum.

13. The method of claim 12, further comprising receiving the received time domain signal from the single user equipment (UE) on a Long Term Evolution (LTE) uplink channel.

14. The method of claim 12, further comprising removing a cyclic prefix prior to applying the at least one band pass filter.

15. The method of claim 12, wherein the portions of the received time domain signal are resource blocks received from the single user equipment (UE).

16. The method of claim 12, further comprising applying a first frequency offset and a first phase offset based on whether normal or extended cyclic prefixes appear in the received time domain signal.

17. The method of claim 12, wherein the correlation function comprises computing a cross-correlation of received I and Q samples.

18. The method of claim 12, wherein the correlation function comprises computing a product of absolute values of received I and Q samples.

19. The method of claim 12, wherein the correlation function comprises $S(\varepsilon,\varphi)=\Sigma_t|\text{real}\{R(t)e^{-i(2\pi\varepsilon t+\varphi)}\}||\text{imag}\{R(t)e^{-i(2\pi\varepsilon t+\varphi)}\}|$, where $R(t)$ is a received time domain signal.

20. The method of claim 12, wherein the range of frequency offset values is from a carrier frequency multiplied by a factor of −0.00000005 to the carrier frequency multiplied by a factor of +30 0.00000005, thereby constituting 100 parts per billion expected error, and the range of phase offset is from 0 to π/2 radians.

21. A method for blind carrier synchronization in a frequency division duplexed system using frequency domain data, comprising:
   applying, at a radio frequency (RF) signal receiver, an N-point discrete Fourier transform (DFT) to a received time domain signal to produce a frequency domain signal;
   selecting, at the RF signal receiver, portions of the frequency domain signal that correspond to signals received from a single user equipment (UE) using a channel schedule; and
   iteratively computing, at the RF signal receiver, a correlation function of I and Q samples of the selected portions of the frequency domain signal over a range of frequency offset values and a range of phase offset values.

22. The method of claim 21, further comprising: identifying a global stationary point of the correlation function over the range of frequency offset values and the range of phase offset values; and applying a final frequency offset and a final phase offset to the portions of the frequency domain signal based on the identified global stationary point.

23. The method of claim 21, wherein the correlation function is computed over a set of input I and Q samples collected over a particular time period.

24. The method of claim 21, further comprising receiving the received time domain signal from the single user equipment (UE) on a Long Term Evolution (LTE) uplink channel.

25. The method of claim 21, wherein the N-point DFT uses one of 128, 256, 512, 1024, 1536 or 2048 for N.

26. The method of claim 21, wherein the selected portions of the frequency domain signal are resource blocks received from the single user equipment (UE).

27. The method of claim 21, wherein the correlation function comprises computing a cross-correlation of received I and Q samples.

28. The method of claim 21, wherein the correlation function comprises computing a product of absolute values of received I and Q samples.

29. The method of claim 21, wherein the correlation function comprises $j(\varepsilon',\varphi')=\Sigma_k\Sigma_l\{AB\}$, wherein $A=|real\{U(l,k,\varepsilon',\varphi')\}|$ and $B=|imag\{U(l,k,\varepsilon',\varphi')\}|$ and $$U(l, k, \varepsilon', \varphi') = e^{-j\left\{2\pi l \varepsilon'\left(1-\frac{k}{N}\right)-\varphi'\right\}} R_{l,k};$$

$$k \in \left[-\frac{N}{2}, \frac{N}{2}-1\right] \cap \mathbb{Z} \; ; l = 1, 2, \ldots, N_{RB} \times N_{SPS}.$$

30. The method of claim 21, wherein the range of frequency offset values is from a carrier frequency multiplied by a factor of −0.00000005 to the carrier frequency multiplied by a factor of +30 0.00000005, thereby constituting 100 parts per billion expected error, and the range of phase offset is from 0 to π/2 radians.

31. A method for blind carrier synchronization in a frequency division duplexed system, comprising:
   computing, at a radio frequency (RF) signal receiver, a three-dimensional surface based on a received frequency division duplexed radio signal, according to the equation $S(\varepsilon,\varphi)=\Sigma_t|real\{R(t)e^{-i(2\pi\varepsilon t+\varphi)}\}||imag\{R(t)e^{-i(2\pi\varepsilon t+\varphi)}\}|$, where R is the received signal;
   locating, at the RF signal receiver, a stationary point of the surface; and
   finding, at the RF signal receiver, a phase offset and a frequency offset based on the stationary point.

* * * * *